United States Patent
Statelov et al.

(10) Patent No.: US 8,160,088 B2
(45) Date of Patent: Apr. 17, 2012

(54) WAY OF BANDWIDTH EFFICIENT DISTRIBUTION OF MULTIPLE TRANSPORT STREAMS WITH PARTIALLY SAME CONTENT

(75) Inventors: Dusan Statelov, Bratislava (SK); Martin Hurton, Melcice - Lieskove (SK)

(73) Assignee: Maindata, SPOL, s.r.o., Bratislava (SK)

( * ) Notice: Subject to any disclaimer, the term of this patent is extended or adjusted under 35 U.S.C. 154(b) by 165 days.

(21) Appl. No.: 12/531,437

(22) PCT Filed: Mar. 14, 2008

(86) PCT No.: PCT/SK2008/050003
§ 371 (c)(1),
(2), (4) Date: Sep. 15, 2009

(87) PCT Pub. No.: WO2008/111921
PCT Pub. Date: Sep. 18, 2008

(65) Prior Publication Data
US 2010/0103950 A1    Apr. 29, 2010

(30) Foreign Application Priority Data

| | | |
|---|---|---|
| Mar. 15, 2007 | (SK) | 5021-2007 |
| Dec. 11, 2007 | (SK) | 5137-2007 |
| Dec. 11, 2007 | (SK) | 5138-2007 |
| Dec. 11, 2007 | (SK) | 5139-2007 |
| Feb. 22, 2008 | (SK) | 5020-2008 |

(51) Int. Cl.
*H04L 12/28* (2006.01)
(52) U.S. Cl. ...................................................... 370/431
(58) Field of Classification Search .......... 370/420–443, 370/463–464, 477–479
See application file for complete search history.

(56) References Cited

U.S. PATENT DOCUMENTS

| | | | | |
|---|---|---|---|---|
| 6,574,794 | B1 * | 6/2003 | Sarraf | 725/63 |
| 7,607,154 | B2 * | 10/2009 | Morello | 725/63 |
| 2001/0055322 | A1 * | 12/2001 | Domon | 370/537 |
| 2002/0064189 | A1 * | 5/2002 | Coupe et al. | 370/537 |
| 2002/0105976 | A1 * | 8/2002 | Kelly et al. | 370/519 |

(Continued)

FOREIGN PATENT DOCUMENTS
EP    1 294 139 A2    3/2003
(Continued)

OTHER PUBLICATIONS

Jiunn-Ru Lai et al: "Mobile multicast with routing optimization for recipient mobility" ICC 2001. 2001 IEEE International Conference on Communications. Conference Record. Helsinky, Finland, Jun. 11-14, 2001; [IEEE International Conference on Communications], New Yori, NY : IEEE, US, vol. 5, Jun. 11, 2001, pp. 1340-1344, XP010553735 ISBN: 978-0-7803-7097-5 paragraph [0011].

(Continued)

*Primary Examiner* — Kwang B Yao
*Assistant Examiner* — Juvena Loo
(74) *Attorney, Agent, or Firm* — Ohlandt, Greeley, Ruggiero & Perle, LLP; George W. Rauchfuss, Jr.

(57) ABSTRACT

A method of bandwidth efficient distribution of multiple transport streams with partially the same content solves the centralized way of distribution of multiple transport streams with partially the same set of TV, radio programs, with the distribution network having significant bandwidth reduction, presenting network adapter to other layers.

18 Claims, 15 Drawing Sheets

Diagram of transport streams satellite transmission.

U.S. PATENT DOCUMENTS

| | | | |
|---|---|---|---|
| 2005/0036519 A1* | 2/2005 | Balakrishnan et al. | 370/503 |
| 2005/0078757 A1* | 4/2005 | Nohrden | 375/240.28 |
| 2006/0062200 A1* | 3/2006 | Wang et al. | 370/352 |
| 2007/0002852 A1* | 1/2007 | Pekonen et al. | 370/389 |
| 2007/0183452 A1* | 8/2007 | Hryszko et al. | 370/474 |
| 2008/0022340 A1* | 1/2008 | Hannuksela et al. | 725/112 |
| 2008/0094520 A1* | 4/2008 | Tkachenko et al. | 348/705 |
| 2008/0216119 A1* | 9/2008 | Pfeffer et al. | 725/40 |

FOREIGN PATENT DOCUMENTS

| | | |
|---|---|---|
| WO | 01/39505 A2 | 5/2001 |
| WO | 01/47281 A2 | 6/2001 |
| WO | 2007/004030 A1 | 1/2007 |

OTHER PUBLICATIONS

Digital Video Broadcasting (DVB) User guidelines for the second generation system for Broadcasting, Interactive ervices, News "Gathering and other broadband satellite applications (DVB-S2); ETSI TR 102 376" ETSI Standards, LIS, Sophia Antipolis Cedex, France, vol. BC, no. VI.1.1, Feb. 1, 2005, XP014027139 ISSN: 0000-001 paragraph s[0004], [4.3.1], [4.5.1], [4.5.2.1], [0006], [06.1], [6.1.2], [7.2.7] figures 12, 15, 19, 21 41.

UDCAST: "DVB-H Mobile TV flexible satellite distribution" [Online] Jan. 2007, pp. 1-16, XP002488959 Retrieved from the Internet: URL:http://www.udcast.com/products/downloads/WP_DVB-H_iSplicer.pdf> paragraphs [02.1], [0003] - [0005].

* cited by examiner

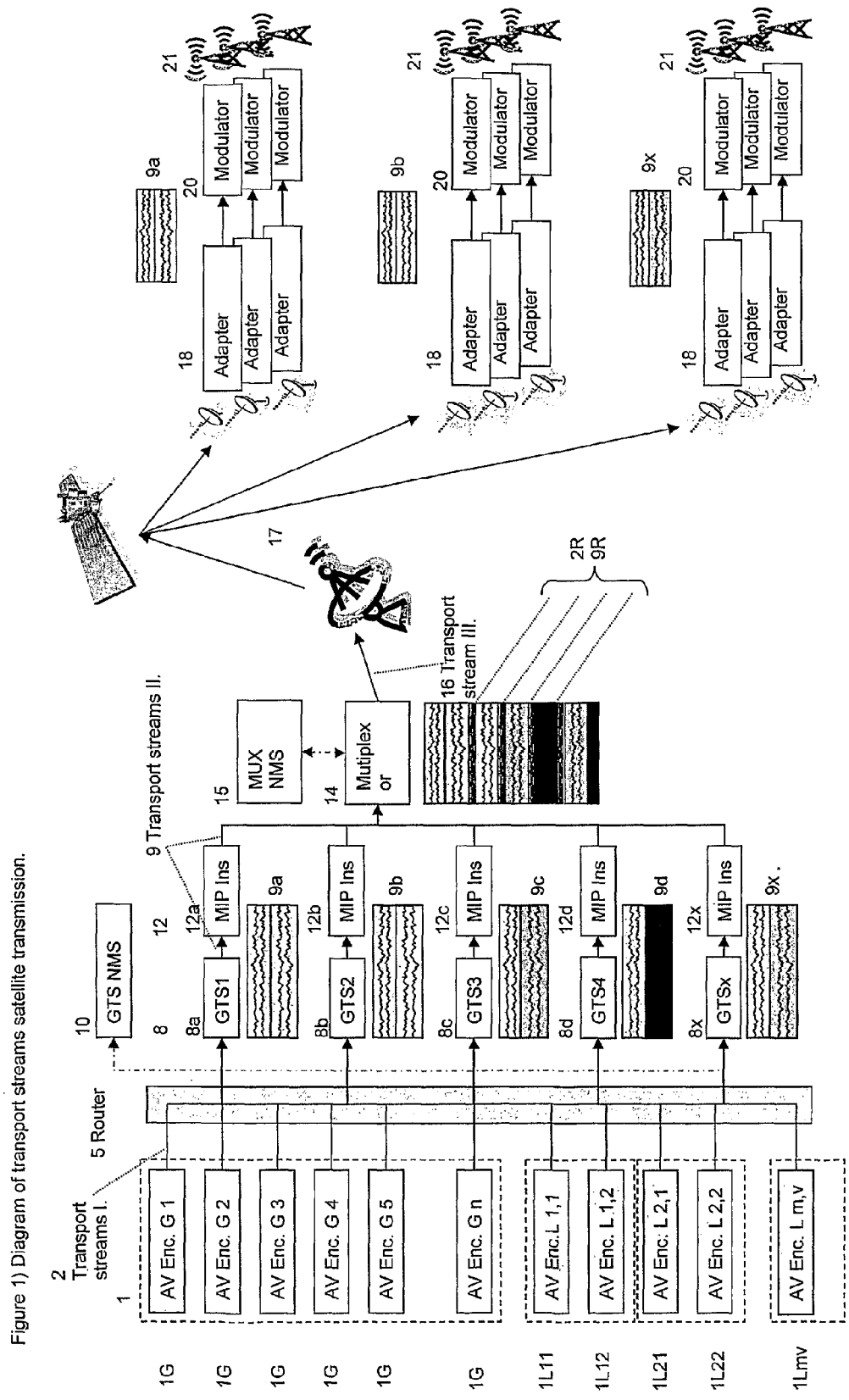
Figure 1) Diagram of transport streams satellite transmission.

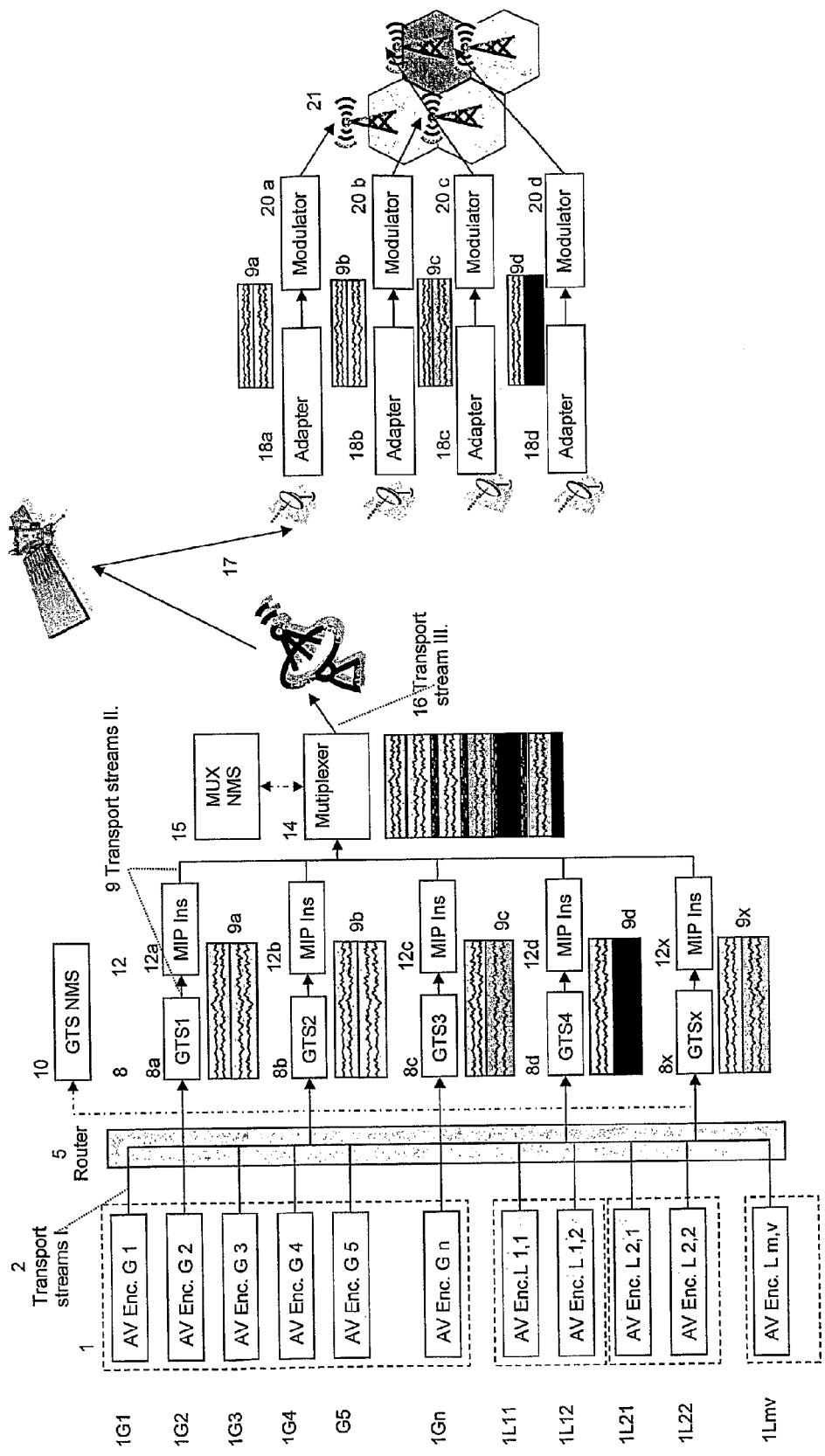
Figure 2) Diagram of the satellite distribution of DVB-H transport streams II. with „seamless handover" support

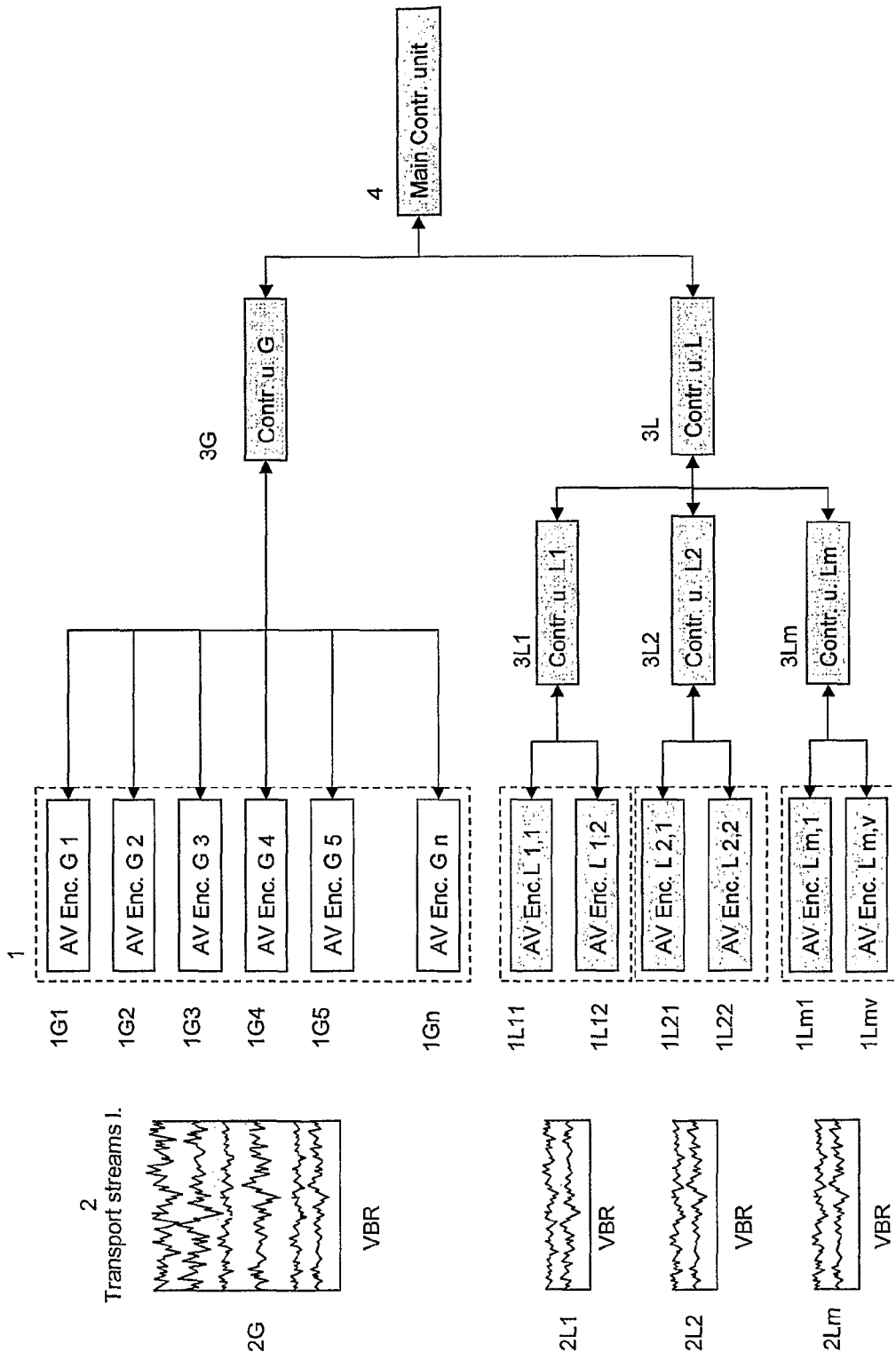
Figure 3) Diagram of 3-level bitrates controll of transport streams I. generators.

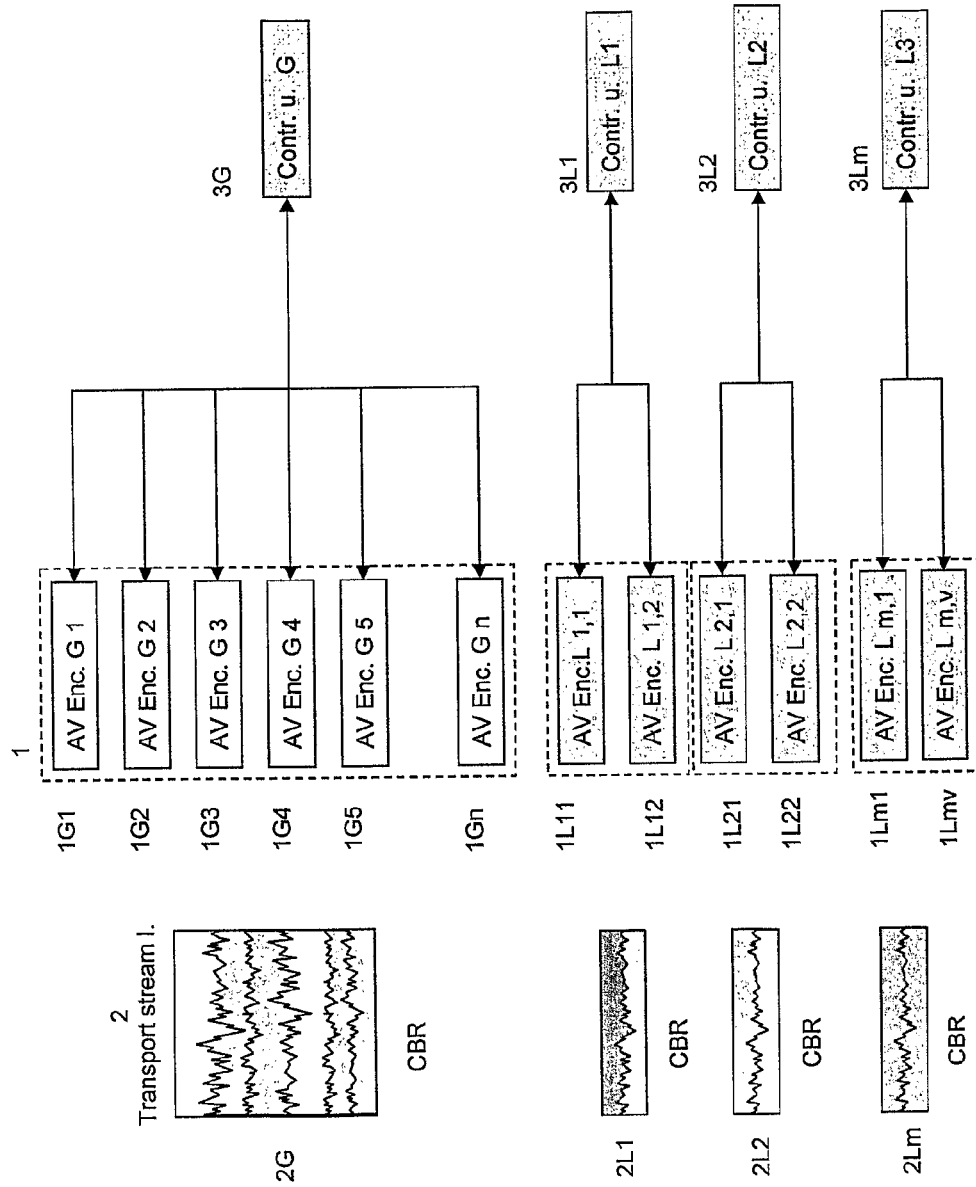
Figure 4) Diagram of 1-level bitrates controll of transport stream l. generators Figure 5) Description of the transport stream II. with VBR AV encoders operating in 2 multiplexes
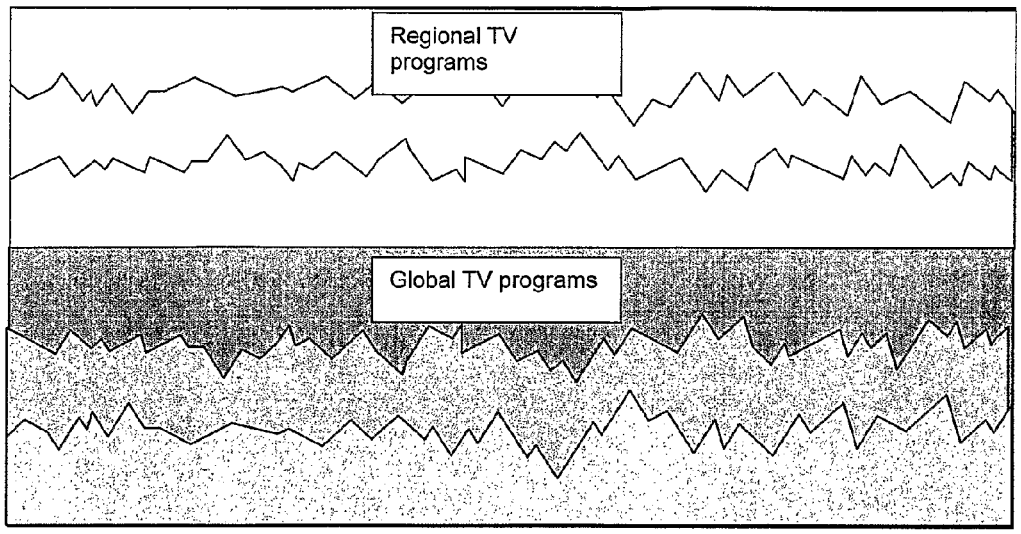
Figure 6) Schematic description of processed transport stream II. with global TV programs reference packets at the output of multiplexer.
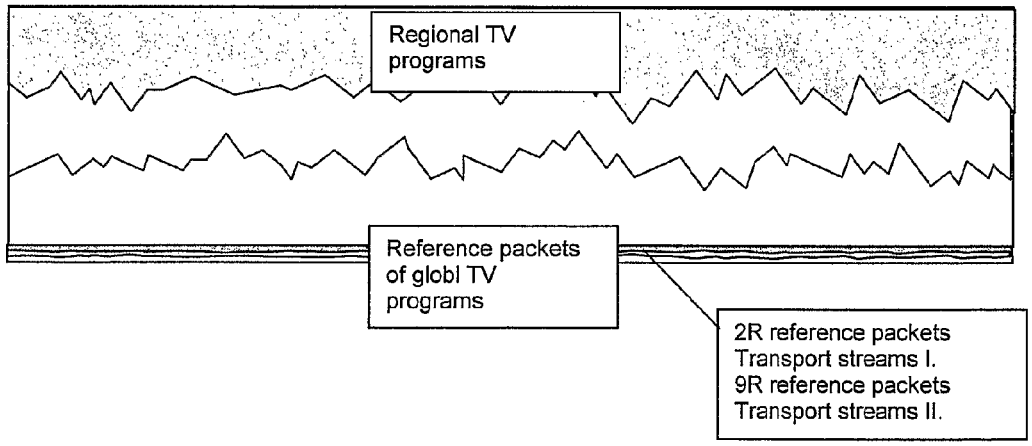

Figure 7) Schematic description of multiplexed transport stream III.
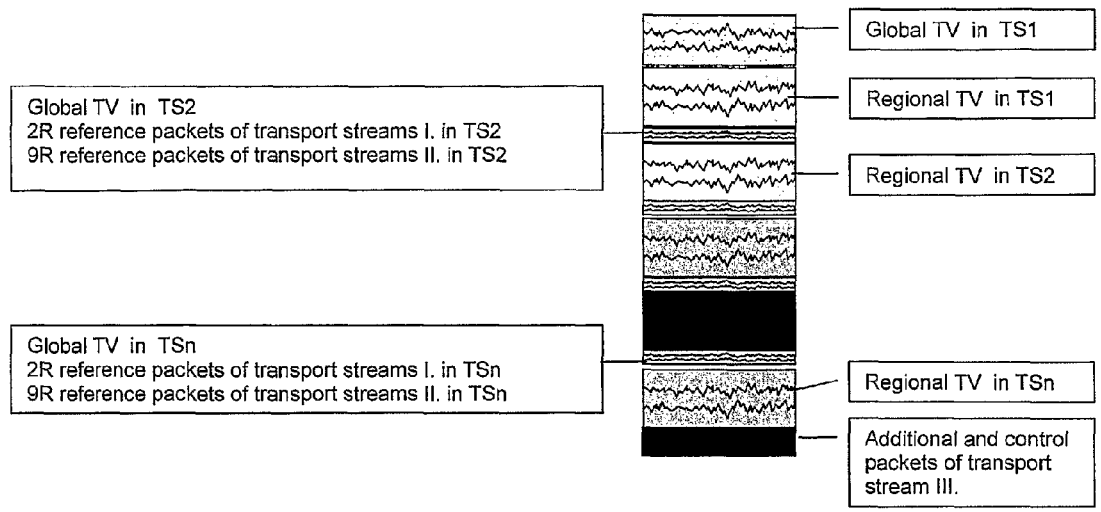
Figure 8) Schematic description of one possible way of replacing part of DVB-H transport stream I. packet with reference one.
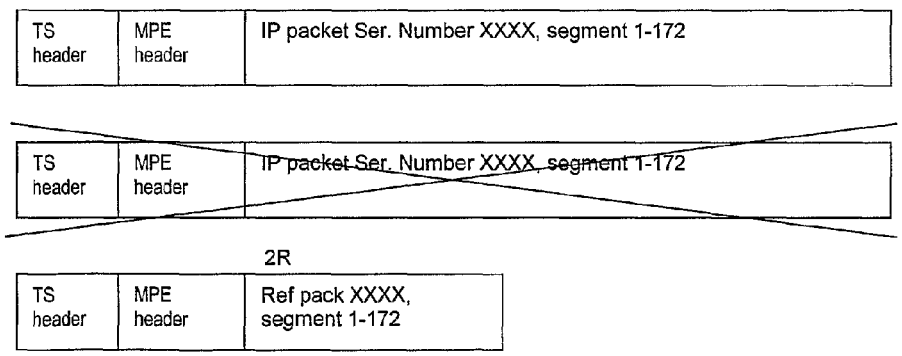

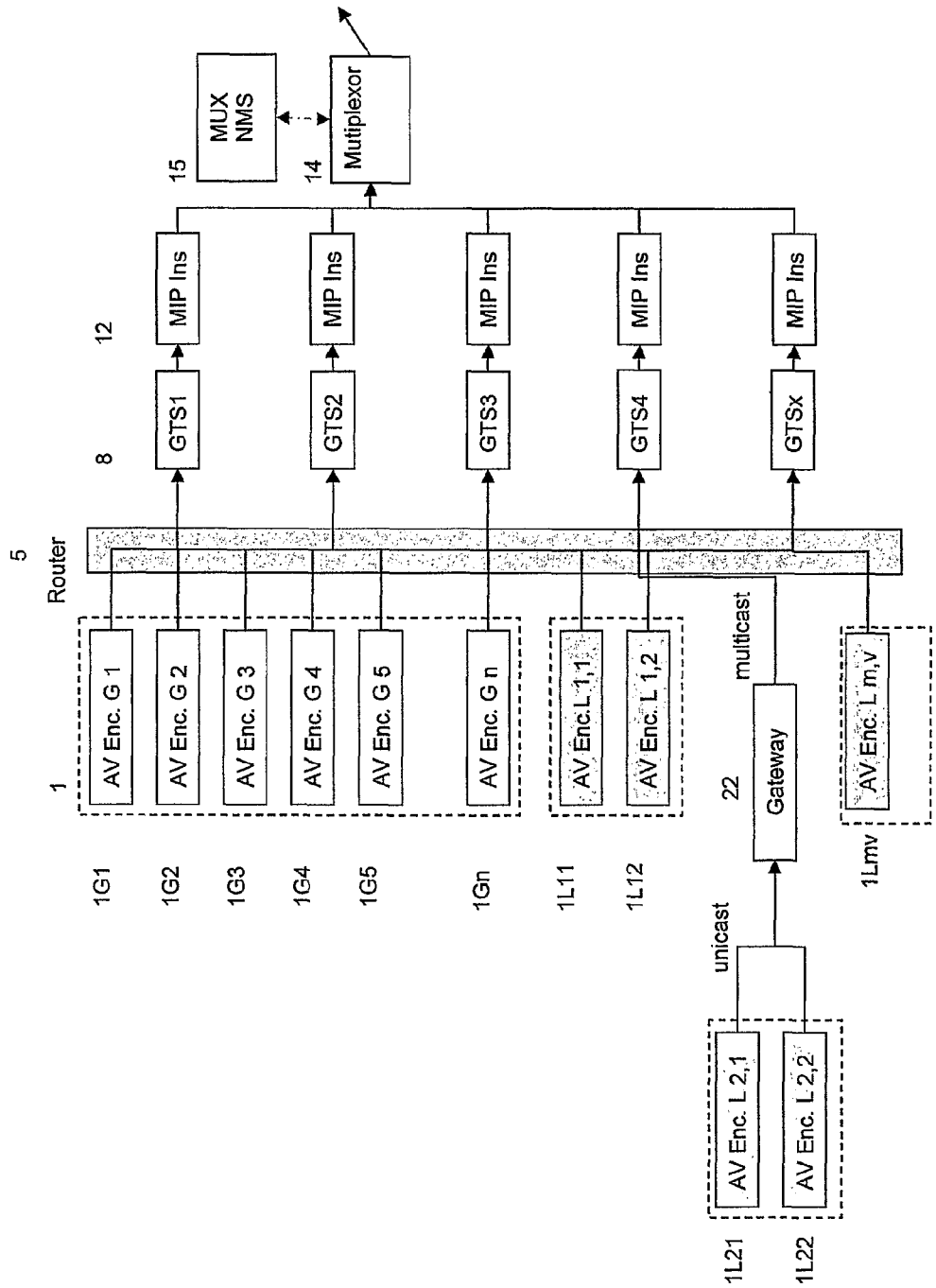
Figure 9) Connection of remote AV encoder via unicast IP network.

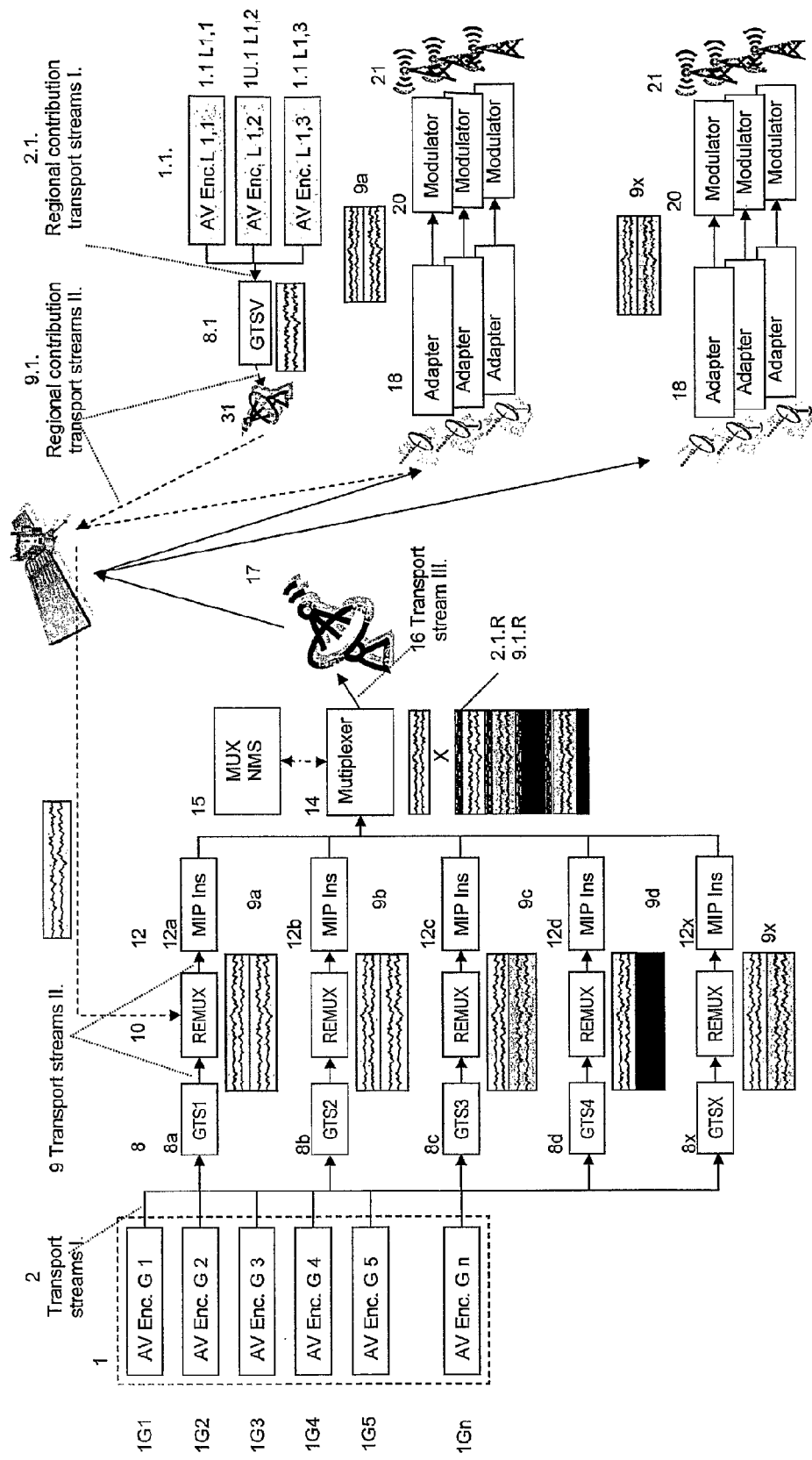
Figure 10) Diagram of satellite transmission of remote regional contribution transport streams II.

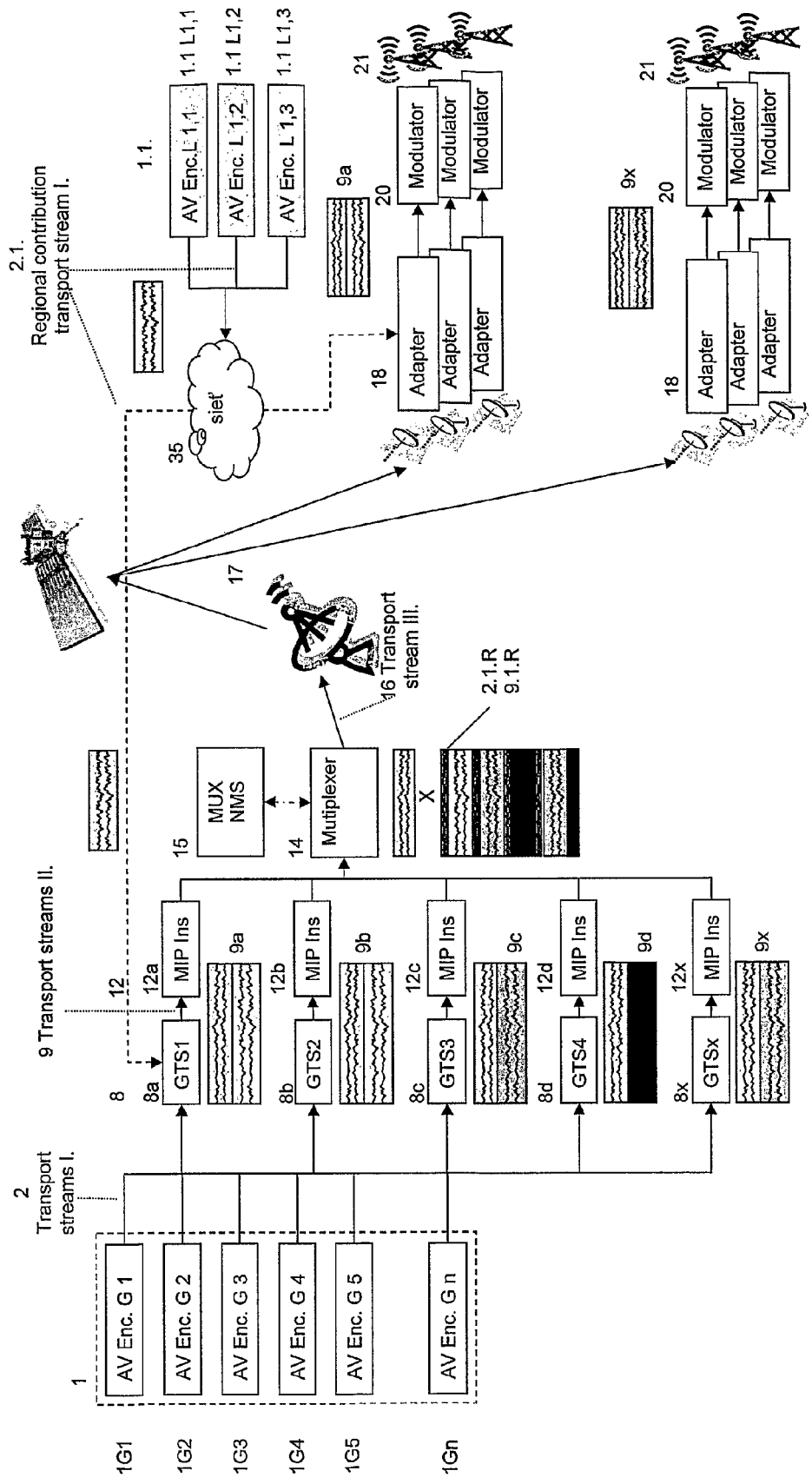
Figure 11) Diagram of satellite transmission of remote regional contribution transport streams I.

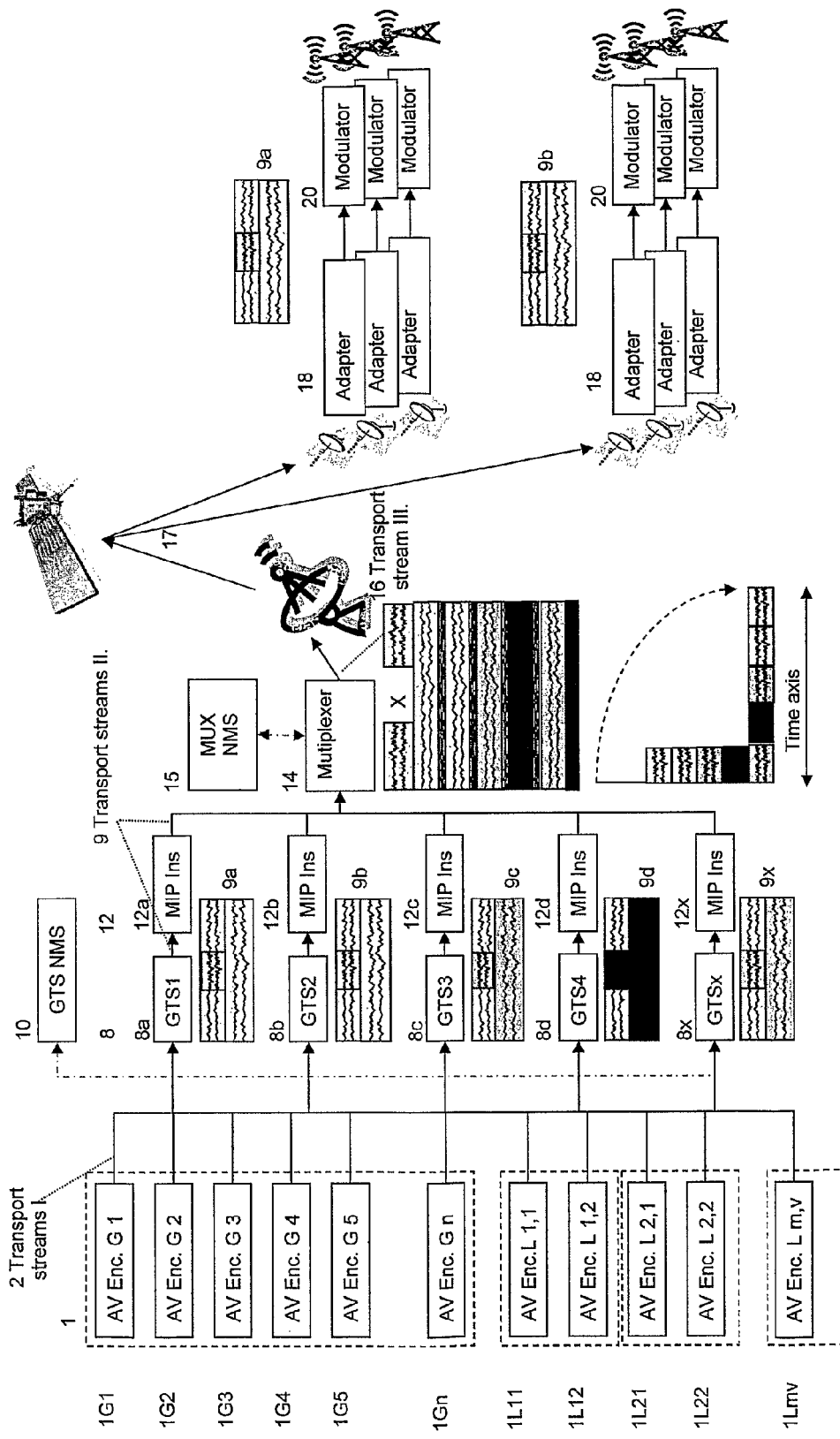
Figure 12) Diagram of satellite distribution of global TV programs with embedded regional advertisement

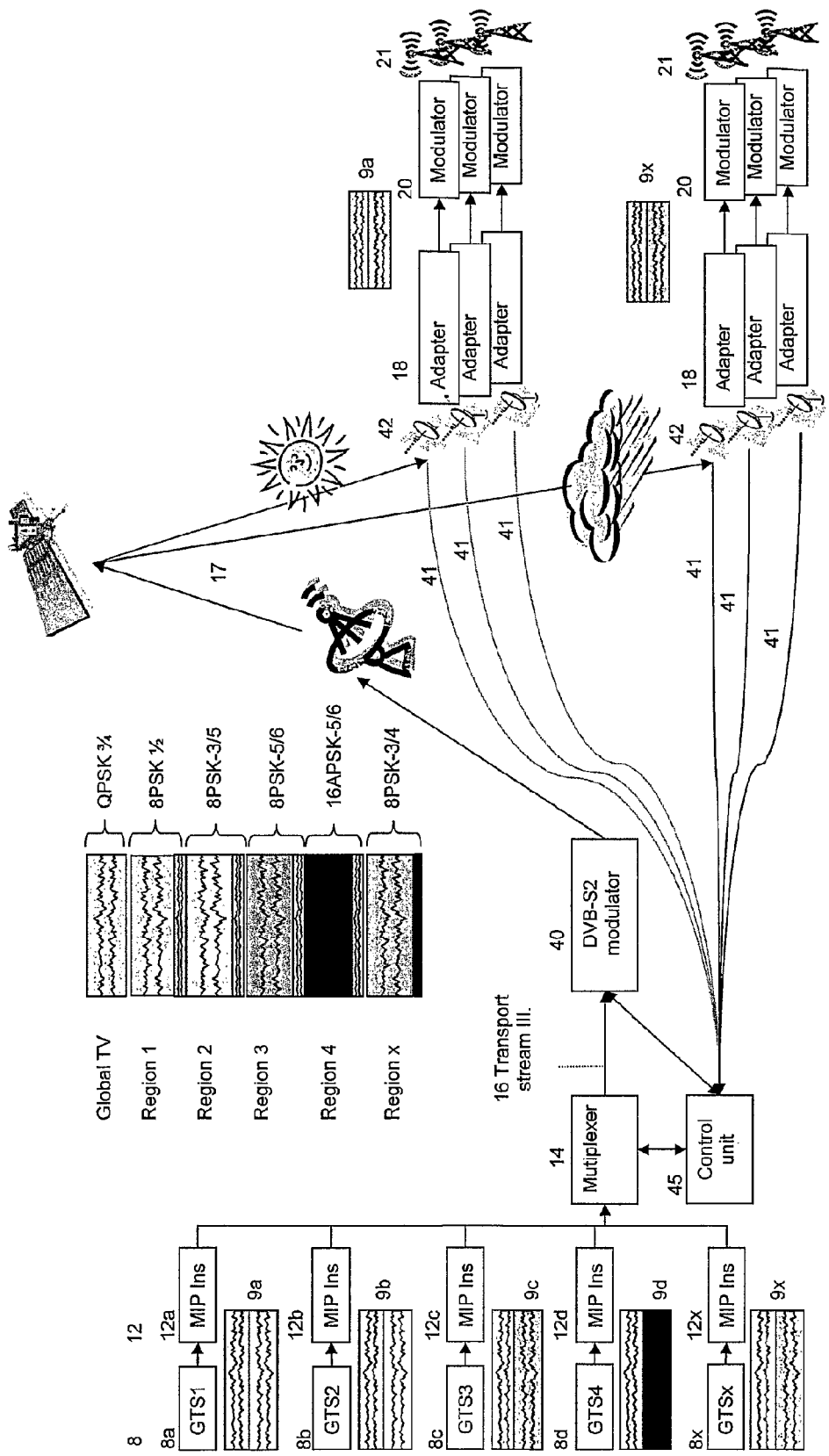
Figure 13) ACM utilization diagram in DVB-S2 satellite transmission

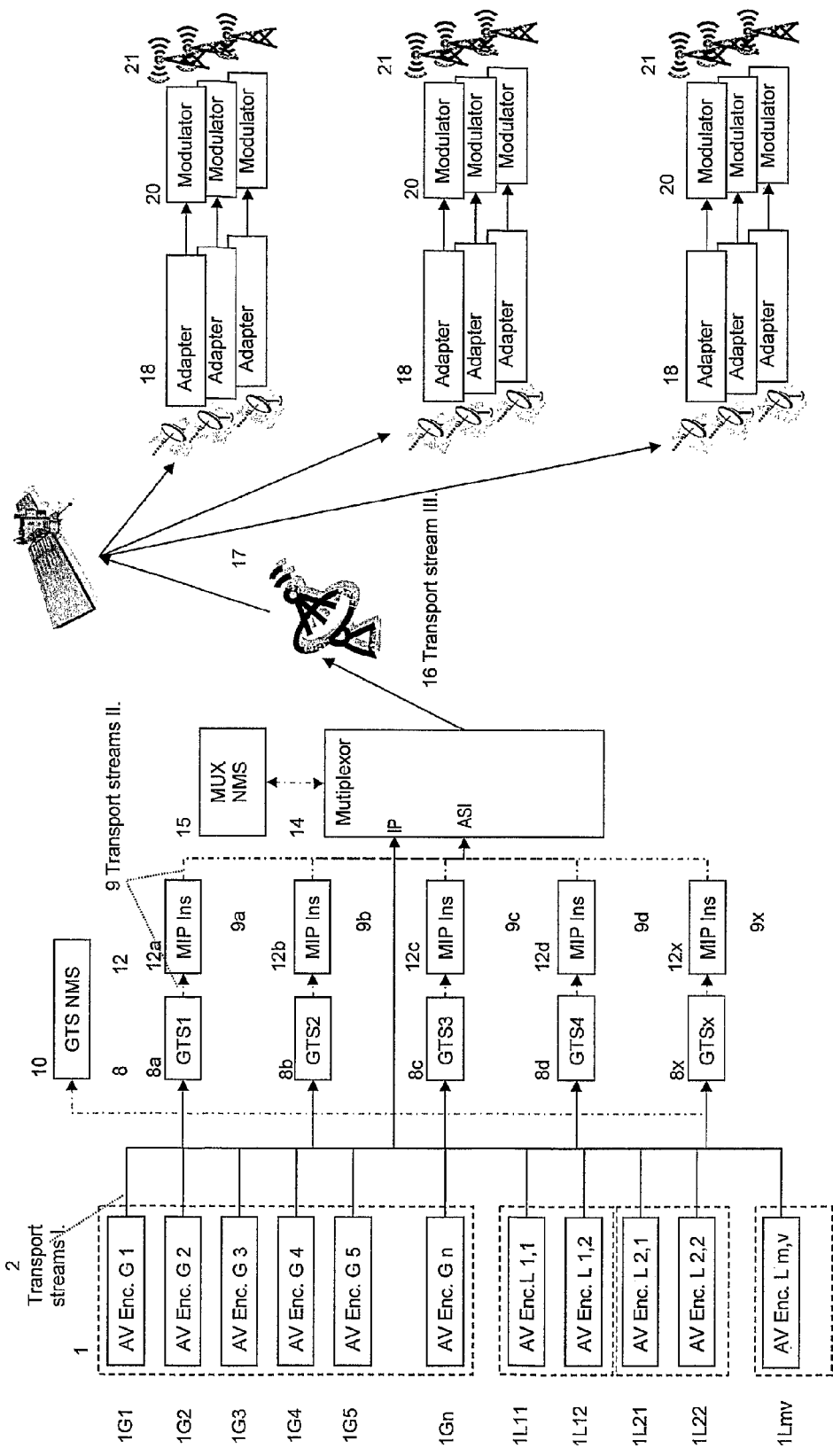

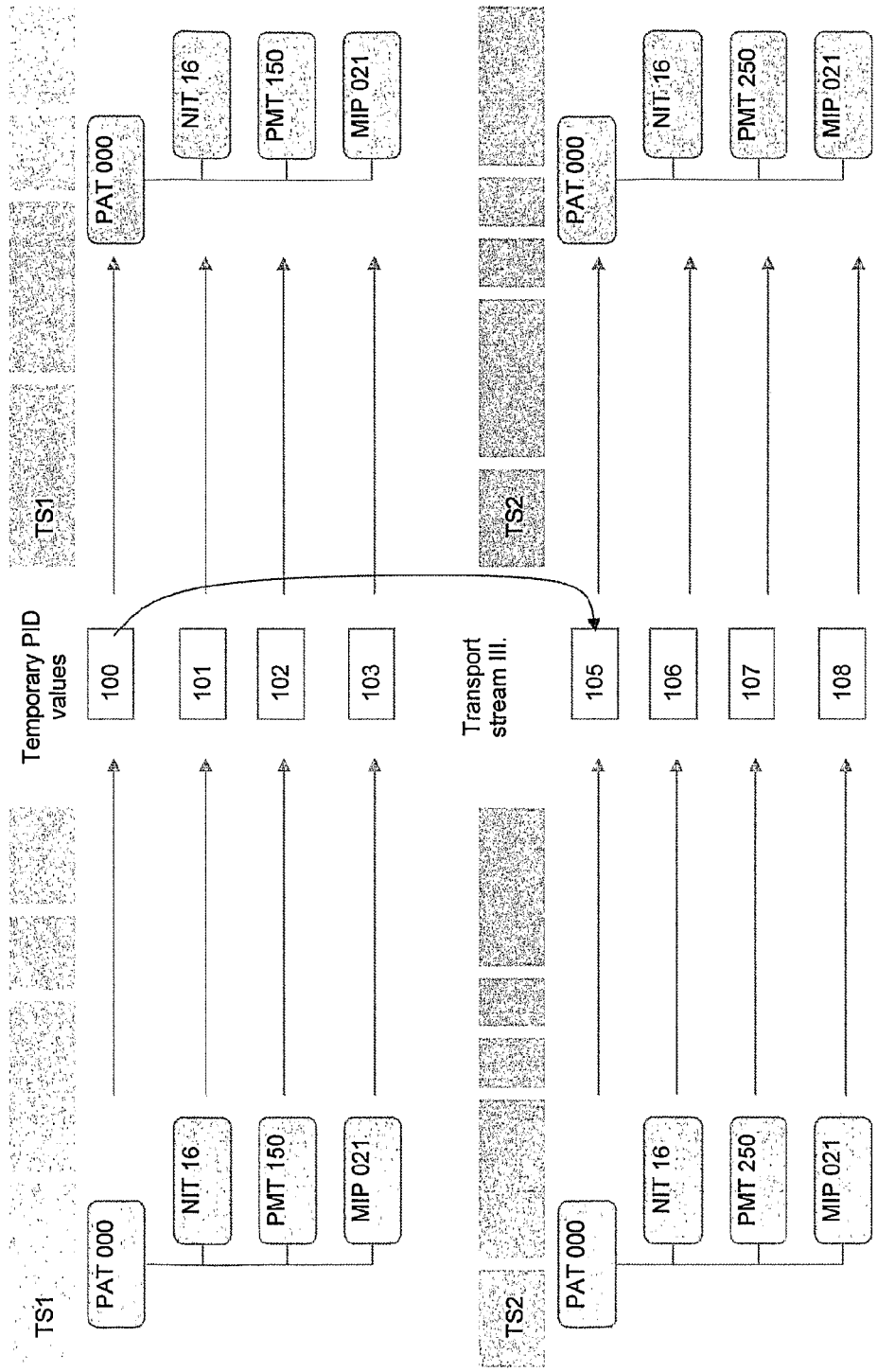
Figure 15) Schematic description of PID remapping during distribution via transportným stream III.

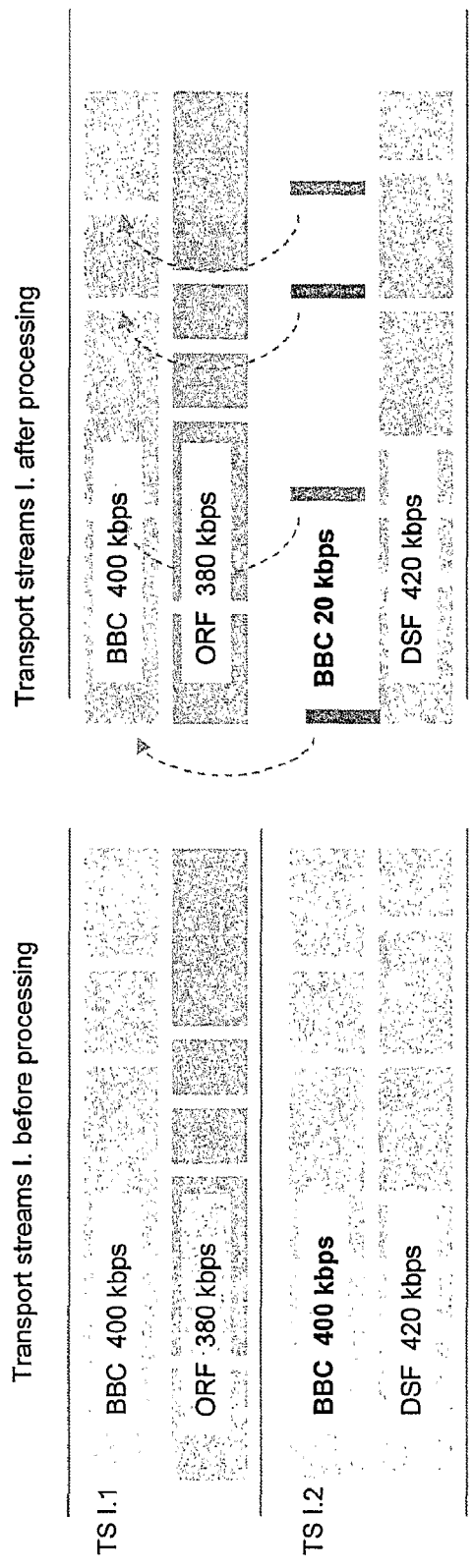
Figure 16) Replacing of repeated transport stream I. packets by reference 2R ones by multiplexer.

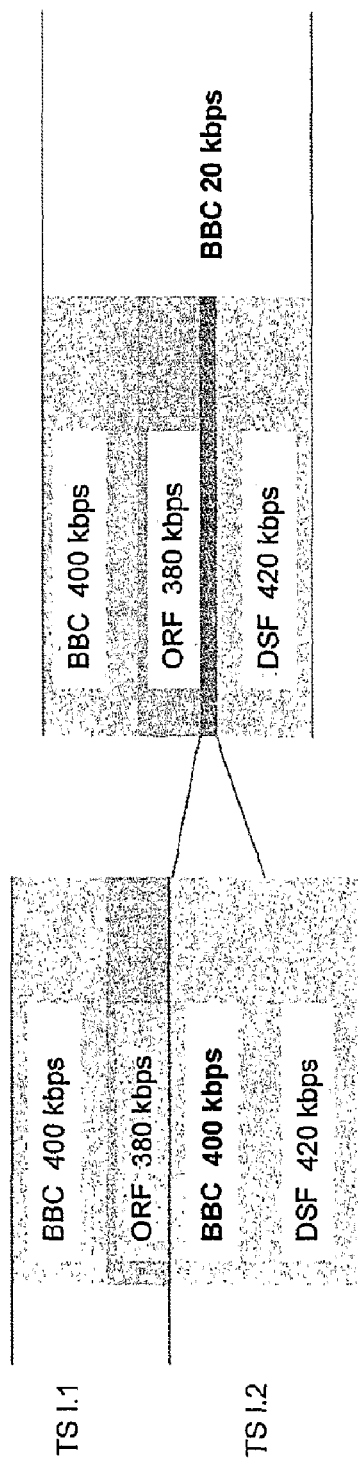
Figure 17) Illustration of bandwidth reduction by the multiplexer.

WAY OF BANDWIDTH EFFICIENT DISTRIBUTION OF MULTIPLE TRANSPORT STREAMS WITH PARTIALLY SAME CONTENT

CROSS-REFERENCE TO RELATED APPLICATIONS

This is a national stage application of International Application PCT/SK2008/050003 filed Mar. 14, 2007 which claims priority to and the benefit of Slovakia Application Serial Nos. PP 5021-2007 filed 15 Mar. 2007, PP 5137-2007 filed 11 Dec. 2007, PP 5138-2007 filed 11 Dec. 2007, PP 5139-2007 filed 11 Dec. 2007, and PP 5020-2008 filed 22 Feb. 2008, the entire disclosures of which are expressly incorporated herein by reference.

BACKGROUND OF THE INVENTION

1. Field of the Invention

The present Invention in the area of telecommunications, is directed to the distribution of digital television signal and also solution based on parallel transmission of contributing regional TV channels to the broadcast center and to the transmitters and also solution for transmitting prerecorded content, like advertisement and also deploying adaptive coding and modulation when using DVB-S2 at distribution path and solution for eliminating additional time delay, caused e.g. by time slicing in DVB-H networks.

2. Background Art

Currently digital TV networks for provisioning of fixed or mobile TV and radio services are being projected and built. These networks are comprised of varying number of transmitters (sometimes even few hundreds) to cover given geographical area with signal. Sometime it is necessary to ensure efficient distribution of digital signal, multiple transport streams with partially different content to different groups of transmitters located in particular regions. Transport stream is a bitstream, being created according to the rules of transmission protocol, for data transmission. Within digital TV and radio networks, there are transport streams generated at different layers.

Transmitter are getting digital signal from a broadcast center in a form of transport stream, which we define as transport stream II. for sake of clarity. In majority of standards for non mobile fixed digital TV networks, whether DVB (European standard), ATSC (USA one) or ISDB (Japanese one), transport stream II. are generated in MPEG-2 TS format, following international standard ISO-13818-1.

Transmitters can be operated as SFN networks (single frequency network is network, where several transmitters is transmitting at the same frequency, or as MFN networks (multi frequency networks). In case of SFN networks, in line with ETSI TS 101 191 standard, transport streams II, are before a distribution network SFN adapted, what means so called MIP inserter, which they are passing through, inserts additional time information, which are utilized by SFN transmitters (after transport stream II. passes distribution network), in parallel of GPS signal reception for precious time synchronization of transmission by multiple transmitters. Requested time precision within SFN networks is in a range of dozen of nanoseconds.

Transport streams II, serve for transmission of transport streams I. Transport stream I. packets are typically longer than transport stream II. packets, so they are segmented to smaller parts, which are, following rules of given transport protocol mapped to transport stream II. packets. In case of digital TV transport streams I. are so called program elementary streams (PES), which serve for transmission of I, B, P video frames, generated by AV encoder, compressing AV signals.

In case of DVB-H signal transport stream I. is formed by IP packets, which in form of RTP/UDP packets bear encapsulated I, B, P AV frames generated by AV encoders.

For the purpose of differentiating transport stream, transmitting more multiplexed regionalized transport streams II, we introduce term transport stream III.

Signal transmission from broadcast center to transmitters is possible realized by different means such as satellite transmission, telecommunication terrestrial links, radio links etc.

Broadcast center is a place where transport streams II. are being generated, multiplexed and processed. Broadcast center is always placed before the distribution network. Adapters are always located at transmitters, after distribution network.

Distribution networks performs transport stream III. transmission from broadcast center to transmitters.

Transmission of multiple transport stream II. with partially different content, without bandwidth reduction, is relatively straightforward task, however distribution network transmission bandwidth is very large and equals to the sum of all particular regionalized transport streams II. bandwidth.

Because of majority of global (national) TV programs is in most of cases (typically in all) transport streams II. the same, it is technically possible, and economically advisable to reduce necessary distribution network bandwidth, without defecting and degrading of transport streams II. parameters and time synchronization.

During 2006 and 2007, 2 companies presented solution for distribution network bandwidth reduction. These solutions address signal distribution in DVB-H networks. UDCAST company, France presented solution with commercial name "iSplicer" and Thomson company, France presented solution with commercial name "EyeGate". Common feature of those solutions is, that transport streams II. as well their SFN adaptation takes place autonomously at each transmitter, after distribution network, and not at the broadcast center, before entrance to the distribution network. Bandwidth reduction is reached by the fact, that transport streams I, in other words source data of TV programs, in case of DVB-H IP packets, are transmitted via distribution only once and do not have to be multiplied separately for each regional transport stream II. All transport streams I. are multiplexed to transport stream III. Adapter in given region from transport stream III. selects only those TV programs (PIDs), related to the given region. Transport stream II. including SFN adaptation is generated directly within the adapter at transmitter.

These solutions have several disadvantages:

They are limited only to DVB-H networks.

ETSI TS 101 191 standardizing transmission of transport streams II. in SFN networks defines single SFN adapter (MIP inserter) for all transmitters within single SFN cell. Both above mentioned solutions, based at generation of transport streams II. and SFN adaptation at transmitters are in contradiction with this standard.

These solutions involve risks of SFN network de-synchronization, transmitting interfering signals (for example in case of different packets losses at different transmitters within same SFN cell, during satellite transmission), as well as high requirements for managing and controlling of such network as well such solutions are more fragile (lost of precise synchronization, chaining errors) etc.

Disadvantage of above mentioned solutions is impossibility of monitoring transport streams II, entering transmitter's modulators, at the broadcast center.

In case when operator of transmitter network is different from operator of broadcast center, it is impossible to define clear determination point for signal and responsibility takeover.

Disadvantage is dependability of these solutions on broadcast center equipments, what among other things eliminates to use 3rd party SFN adapters.

Another disadvantage is non support of network adapter architecture.

Disadvantage is the need to eventually adapter's modification or replacement in case of standards changes.

Disadvantage is also inability to facilitate interactive communications in between of transport stream II. generators and other equipment at broadcast center like AV encoders, EPG, ESG generators, FLUTE servers and others.

SUMMARY OF THE INVENTION

Above mentioned disadvantages are eliminated by this solution for transmission of multiple transport streams II. with partially same content according to this invention, which nature consists in that transport streams I, from generators of transport streams I, are in paralell transmitted to multiple generators of transport streams II, where partially different transport streams II. are being generated. They enter multiplexer, where transport stream I. packets are being decapsulated from transport stream II. packets, or transport streams I. are entering multiplexer in parallel with transport streams II, in order to eliminate eventual delay brought by generators of transport streams II.

In a case when packet of transport stream I, or packet, eventually only part of transport stream II. packet, are in given time period present in multiplexer more than once, such packets or its part, are transmitted in full extent via distribution network only once. Multiplexer repeatedly presented transport streams I. packets replaces with reference packets of transport stream I. packets, serving for unique identification of transport stream I. packets as well determination of positions of packet segments within packets of transport stream II. and/or part of transport stream II. packet multiplexer replaces with reference packets, eventually part of transport stream II. packets, serving for unique identification. Multiplexer behind transport stream I. packets in full extent and packets or parts of transport stream II. packets in full extent, inserts into output transport stream III. also reference packets of transport stream I. packets, reference packets of full packets eventually parts of transport stream II. packets, additional control information, and/or additional information about packet identification. After transmission of transport stream III. via distribution network, adapter demultiplexes given transport stream II. from transport stream III. and performs replacement of transport stream I. reference packets with full extent transport stream I. packets and positioning of those packets or it segments to original positions within packets and within transport stream II, and eventually replaces reference packets of transport stream II. packets or it segments with original full extend transport stream II. packets in such a way, that adapter outputs bitwise identical transport stream II. with one entering multiplexer.

Extension of above mentioned method is transmission of contribution regional transport streams I., among transport streams I., are transmitted in parallel to the transport stream II. (9) generators (8) at the broadcast center, as well as to the adapters (18), from a single remote common source a generator (1.1.) of contribution regional transport streams I. (2.1.), in parallel to transport stream II. generators at broadcast center and also to the adapters.

Multiplexer replaces original contribution regional transport streams I. packets with reference packets, serving for unique identification of original contribution regional transport stream I. packets, and for specification of positions of contribution regional transport stream I. packets, or packet segments, within the transport stream II. packets, and after transmission via distribution network, adapter replaces reference packets with original contribution regional transport stream I. packets, it received, in parallel or slightly in advance, from common source—generator of contribution regional transport streams I.

Extension of above mentioned method is that contribution regional transport streams I., within transport streams I., are transmitted to the generator of transport streams II. and from here, a single remote common source, regional contribution transport streams II. are transmitted in parallel to transport stream II. generator at broadcast center as well as to adapters at transmitters. Multiplexer reconstructs regional contribution transport stream I. packets from regional contribution transport streams II. and replaces original contribution regional transport streams I. packets with reference packets, serving for unique identification of original contribution regional transport streams I. packets, and for specification of positions of transport stream I. packets, or packet segments, within the transport stream II. packets, Adapter replaces reference packets from transport stream III, with original contribution regional transport stream I. packets, it received in parallel or in slightly in advance, from a single common source—generator of regional contribution transport streams II.

Extension of above mention method is, that transport streams I. packets, containing non real-time recorded content, are by multiplexer replaced by transport stream I. reference packets, serving for unique identification of original transport stream I. packets. Original transport stream I. packets are transmitted to adapters in advance. Adapter replaces transport stream I. reference packets with original transport stream I. packets, stored in adapter memory, where they were transmitted in advance.

Extension of above mention method is, that DVB-S2 receivers or adapters are in real-time sending information about current satellite link channel quality via return channel to the control unit at broadcast center. Control unit, based on those information periodically calculates optimal parameters of satellite DVB-S2 transmission, resulting in lowest satellite distribution network bandwidth requirement. Control unit periodically sends information about calculated DVB-S2 satellite transmission parameters settings, for given transport stream III. packet individually per particular region and for global content, to the DVB-S2 modulator, which adaptively sets optimal parameters settings, such as coding and modulation.

Extension of above mention method is, reconstruction of content packets at lowest layer, which are encapsulated within transport stream I. packets. In case content packet appears in more transport streams I. more than a once, it is transmitted in original form just once, and repeated content packets are replaced by reference packets. By this way it is possible to reduce bandwidth when identical video frames are encapsulated to different transport stream I. formats, for example RTP in case of DVB-H and MPEG-2 PES for DVB-T.

In case of digital TV networks based on MPEG-2 formats, where PID are used, some PIDs use default values, like PAT table etc. In a case, where multiple MPEG-2 transport streams II. are multiplexed into single transport stream III, by MPEG-2 TS splicing method, conflicts of PID values do occur by principle. These PID values conflicts always occur in case of PSI/SI tables with default values, but can also accidentally occur also for other PIDs with freely configurable values. PID values can be solved by temporary different PID values during distribution of multiplexed transport stream III. This process is known as so called PID remapping.

In multiplexer identical-conflicting PIDs from different transport streams II. are changed to temporary different values, which are neither used in any other transport stream nor assigned for temporary values. Multiplexer inserts into transport stream III. information about association between temporary and original PIDs. Adapter returns temporary PID values to original ones.

In case, via transport streams II. are transmitted live TV or radio programs, transport streams II. generator can be different equipments like AV encoder, PSI/SI tables generator, ESG server (for DVB-H), EPG server (for DVB-T), teletext server (e.g. for DVB-T), MHP server (for DVB-T) or CAS server etc.

In a case, via transport streams II. are transmitted recorded TV or radio programs, transport streams II. generator can be different equipments like streaming server, PSI/SI tables generator, ESG server (for DVB-H), EPG server (DVB-T) teletext server (DVB-T), MHP server (DVB-T), or CAS server etc.

In a case, via transport streams II. are transmitted files, transport streams II. generator can be file multicast server, FLUTE server (for DVB-H) or CAS server etc.

Transport stream I. generator's output control can vary as follows:

1) Output bitrates of all transport stream I. generators are constant (CBR)

2) Output bitrates of each transport stream I. generator is variable while constant is summary of output bitrates of transport stream. I. generator for global programs and as well summary of output bitrates of transport stream I. generator for regional programs per particular region, while control unit of global programs manages global transport stream I. generators and regional control unit manages several subordinated control units per regional programs for particular region.

3) Summary of output bitrates of global as well as regional programs transport stream I. generator are variable (VBR), but constant is summary of variable bitrates of global and regional programs per one region. Main control unit manages global programs control unit and regional programs control unit. Global programs control unit manages global programs transport stream I. generators, while regional programs control unit manages subordinated control units of regional programs per particular regions, which further control output bitrates of regional transport stream I. generators per particular region.

In case of DVB-H networks, multiplexer may, before entering distribution network, eliminate FEC data from MPE-FEC section, and after transmission via distribution network, adapter calculates FEC data and inserts into particular MPE-FEC sections. By this way it is possible reduce bandwidth in relation to the MPE-FEC strength configuration.

In case of DVB-H networks with requested support of seamless handover, transport stream II. generators generate multiple transport streams with time shifted IP packet within bursts. For each MFN network max 4 different frequencies are necessary to avoid interference. Max number of transport streams II. for seamless handover support is max. 4 per region. Because even time shifted transport stream I. IP packets are identical, bandwidth increase for transmission of such time shifted transport streams II. is strongly reduced.

In order to increase transmission bandwidth it is possible eliminate null packets from transport streams II. before entering distribution network. Instead of null packets information about null packet position, e.g. also continuity counter, optionally also selected items from TS packet header or entire header can be inserted. Based on this information null packets based on those additional information are reinserted into transport stream II. In case of SFN network it is necessary that all adapters within single SFN cell insert bitwise identical null packets, because null packets payload content is not defined.

Multiplexed transport stream III. may be distributed via cable and wireless telecommunication terrestrial networks or via telecommunication satellites or via terrestrial radio networks e.g. WiMax, WiFI, 3G, 4G or via multicast IP networks, via terrestrial cable networks or via telecommunication airships/airstats etc.

Transport stream's II. formats can follow standards like DVB, ATSC, ISDB, IP, DAB DVB-H, DAB, DAB-IP, DMB, CMMB, MediaFlo, BCAST, DVB-SH DVB-T2, GSE etc.

In case of DVB-H networks or IPTV, transport streams I. generators outputs can be transmitted to transport stream II. generators via IP network. In case of DVB-T, DVB-C networks generator's outputs can be transmitted via DVB-ASI link.

Transport stream I. generators with IP outputs may be located remotely at long distance outside of broadcast center up-link. Because of transport stream I. generators with IP outputs in majority generate multicast transmission, and majority of IP networks has switched off IP multicast support, or charged, it is possible to use unicast tunnel between remote transport stream I. generator to broadcast center. Broadcast center is equipped by IP gateway, which turns back IP unicast into IP multicast. This allows deliver transport stream I. packets from remote generator to multiple transport stream II. generators.

Above mentioned method of transmission of multiple transport streams II. with partially same content has following advantages:

It enables digital TV broadcast network operators distribute from one center transport streams with partially same and partially different content presenting transmission of global and regional programs, with significant reduction of distribution network bandwidth.

Comparing to ordinary method of distribution it achieves significant bandwidth reduction. Assuming same bandwidth per program, considering additional bandwidth of 5% for control packets, and 10% of bandwidth for repeated global TV programs across regions, without FEC data transmission and without seamless handover support bandwidth savings is as follows:

| Number of transport stream (regions) * | Number of Global programs | Number of Regional programs | Distribution bandwidth savings | Digital TV SD resolution | | Mobile Digital TV CIF resolution | |
|---|---|---|---|---|---|---|---|
| | | | | Normal bandwidth [Mbps] | Achieved bandwidth [Mbps] | Normal bandwidth [Mbps] | Achieved bandwidth [Mbps] |
| 10 | 20 | 2 | 79% | 55.0 | 11.6 | 660 | 135 |
| | 15 | 3 | 71% | 45.0 | 13.0 | 540 | 156 |
| | 10 | 5 | 54% | 37.5 | 17.3 | 450 | 208 |
| 20 | 20 | 2 | 85% | 110.0 | 16.8 | 1320 | 202 |
| | 15 | 3 | 77% | 90.0 | 20.9 | 1080 | 250 |
| | 10 | 5 | 59% | 75.0 | 30.5 | 900 | 365 |

|  |  |  | | Digital TV SD resolution | | Mobile Digital TV CIF resolution | |
| --- | --- | --- | --- | --- | --- | --- | --- |
| Number of transport stream (regions) * | Number of Global programs | Number of Regional programs | Distribution bandwidth savings | Normal bandwidth [Mbps] | Achieved bandwidth [Mbps] | Normal bandwidth [Mbps] | Achieved bandwidth [Mbps] |
| 30 | 20 | 2 | 87% | 165.0 | 22.0 | 1980 | 265 |
|  | 15 | 3 | 79% | 135.0 | 28.8 | 1620 | 345 |
|  | 10 | 5 | 61% | 112.5 | 43.6 | 1350 | 523 |

* Number of transport streams is equal to number of regions in case, there is no support for seamless handover in DVB-H networks, in case of required seamless handover support number of transport streams quadruples.

According to the ETSI TR 101 191 standard about SFN transmitters synchronization it is required to use single SFN adapter (MIP Inserter) for all transmitters within single SFN cell. This method fulfills above mentioned requirement, thanks to what guarantees synchronization of transmission of SFN transmitters. This increases resistance agaings chaining errors and lost of SFN synchronization, respectively provides quicker resynchronization of transmitters in case of different packets lost during transmission to different transmitters in the same SFN cell.

Network adapter architecture this method is transparent to all equipments at broadcast center side as well as to all equipments at transmitters side, what provide investments protection. It is not necessary to replace adapters in the network in case of standards change at different layes, so it is "future proof" solution.

Advantage of this method is possibility to choose SFN adapter from any 3rd party manufacturer.

Thanks to keeping all key equipments at broadcast center such network is easier monitorable and has lower maintenance costs.

Thanks to generation of all transport streams II. at a broadcast center it is possible to analyze validity of transport streams centrally at broadcast center.

In case of DVB-H network it allows improving reliability of distribution network by utilizing MPE-FEC forward error correction mechanism.

Given method allows distribution network bandwidth saving even when TV programs are formatted according to different formats, e.g. same TV program is encapsulated in parallel to IP-UDP-RTP packets as well as to MPEG-2 PES.

Given method allows connecting remotely located AV encoder via network without multicast support.

Given method supports 3 layered statistical multiplex of AV encoders.

Given method allows connecting streaming servers, filecast servers, e.g. FLUTE into same statistical multiplex with AV encoders.

Given method allows utilization of unused capacity by filecast servers, e.g. FLUTE server. Thanks for the centralized architecture it is possible to use only single CAS (Conditional Access System), without distributed crypting (key management), what provide investments costs reduction and increases security of operations and crypting keys management.

Given method is fully transparent to all equipments, platforms generating transport streams. Given method enables efficient distribution also in case of required support of "seamless handover" in DVB-H networks.

Allows quick twoway communication among all broadcast center equipments, what improves possibilities of equipments control e.g. statistical multiplex, opportunistic data etc.

Reduces distribution bandwidth for transmitting regional contribution TV channel, which are transmitter in parallel to adapters as well as to the broadcast center, by half, while maintains central generation of control packets of transport streams with single SFN adapter placed before distribution network, even when data are inserted directly in the TV transmitter.

Allows utilization of efficient distribution of multiple transport streams with partially same content in case, when it is required to insert regional recorded content e.g. regional advertisement into global TV channels. Because of majority of advertisement shots are frequently repeated, it is possible repeated advertisement, whether in global or regional TV program, transmit only once, what further improves bandwidth reduction of distribution network. Reduction ratio depends on number of repetitions of given add and from its duration share in entire TV program transmission time.

Usage of adaptive coding and modulation optimizes bandwidth usage of satellite DVB-S2 network according to the actual transmission condition in each region, it means improves Bit/Hz ratio, what decreases satellite distribution link operation costs.

This method reducing bandwidth of distribution network and keeping transparency, is possible to use in combination with parallel connectivity of transport streams I. and transport streams II. to the multiplexer, what allows eliminate several seconds delay of procession regionalized DVB-H transport streams organized by time slicing.

BRIEF DESCRIPTION OF THE DRAWINGS

An overview of figures in the drawing

FIG. 1) Diagram of transport streams satellite transmission.

FIG. 2) Diagram of the satellite distribution of DVB-H transport streams II. with "seamless handover" support FIG. 3) Diagram of 3-level bitrates control of transport streams I. generators.

FIG. 4) Diagram of 1-level bitrates control of transport stream I. generators

FIG. 5) Description of the transport stream II. with VBR AV encoders operating in 2 multiplexes FIG. 6) Schematic description of processed transport stream II. with global TV programs reference packets at the output of multiplexer.

FIG. 7) Schematic description of multiplexed transport stream III.

FIG. 8) Schematic description of one possible way of replacing part of DVB-H transport stream I. packet with reference one.

FIG. 9) Connection of remote AV encoder via unicast IP network.

FIG. 10) Diagram of satellite transmission of remote regional contribution transport streams II.

FIG. 11) Diagram of satellite transmission of remote regional contribution transport streams I.

FIG. 12) Diagram of satellite distribution of global TV programs with embedded regional advertisement FIG. 13) ACM utilization diagram in DVB-S2 satellite transmission FIG. 14) Diagram of parallel connection of DVB-ASI and IP inputs to Multiplexer FIG. 15) Schematic description of PID remapping during distribution via transportným stream III.

FIG. 16) Replacing of repeated transport stream I. packets by reference 2R ones by multiplexer.

FIG. 17) Illustration of bandwidth reduction by the multiplexer.

DETAILED DESCRIPTION OF THE DRAWINGS

Examples of Embodiments

Example 1

Example consist of, transport streams I. 2, from transport stream I. 2 generators 1, are transmitted in parallel to multiple generators 8 of transport streams II. 9, where partially same (regionalized) transport streams II. 9 are generated, which are transmitted to the multiplexer 14, where transport streams I. 2 packets are reconstructed from transport streams II. 9; or multiple transport streams I. 2 are transmitted to the multiplexer 14 in parallel with transport streams II. 9, for example in order to eliminate time delay brought-in by transport streams II. 9 generators 8. Time delay occurs for example in case of DVB-H time slicing.

For reconstructing of transport stream I. 2 packets from transport streams II. 9 by multiplexer 14 it is possible define max time of waiting for completing single transport stream I. 2 packet. This is important for controlling max time delay in case of section packing in MPEG-2 TS.

When, in both cases, packet of transport stream I. 2, and/or packet, or only a part, of the packet of transport stream II. 9, appears in a given time period more than once, it is transmitted only once in its original form, via transport stream III. 16. Multiplexer 14 replaces repeatedly appearing transport stream I. 2 packets, with transport stream I. 2 reference packets 2R, serving for unique identification of original transport stream I. 2 packets, and for the specification of positions of transport stream I. 2 packets, or packet segments, within the transport stream II. 9 packets and/or repeatedly appearing packets, or parts of packets, of transport stream II. 9, multiplexer 14 replaces with transport stream II. 9 reference packets 9R, serving for unique identification of packets, or parts of transport stream II. 9 packets. Multiplexer 14 stores 1 copy of original transport stream in so called dictionary.

Multiplexer 14 inserts, into the output multiplexed transport stream III. 16, beside the original transport stream I. 2 packets, and/or original packets, or parts of, transport stream II. 9 packets, also transport stream I. 2 reference packets 2R, reference packets 9R of packets, or parts of transport stream II. 9 packets, and additional control information, and/or additional identification information.

Transport stream III. 16 is transmitted to the transmitters, where adapters 18 are located, via a distribution network 17. Adapter 18, demultiplexes selected transport stream(s) II. 9 from transport stream III. 17, and replaces transport stream I. 2 reference packets 2R with original transport stream I. 2 packets, and places these packets, or their segments, to their original positions within transport stream II. 9 packets, and/or replaces reference packets 9R with original packets, or part of transport stream packets II. 9, in such a way, that adapter 18 outputs transport stream II. 9 bitwise identical with the transport stream II. 9 at the multiplexer 14 input for given region.

Solution is described at FIG. 1) Diagram of transport streams satellite transmission., FIG. 5) Description of the transport stream II. with VBR AV encoders operating in 2 multiplexes, FIG. 6) Schematic description of processed transport stream II. with global TV programs reference packets at the output of multiplexer., FIG. 7) Schematic description of multiplexed transport stream III., FIG. 8) Schematic description of one possible way of replacing part of DVB-H transport stream I. packet with reference one., FIG. 16) Replacing of repeated transport stream I. packets by reference 2R ones by multiplexer., FIG. 17) Illustration of bandwidth reduction by the multiplexer.

Example 2

Is analogical to example 1, applied to DVB-H networks with satellite distribution. Uncompressed AV signals of global TV programs enter AV encoders 1 (1G1 to 1Gn) (equipments performing AV signal compression), being part of one statistical multiplex (AV encoders 1G1 to 1Gn). Uncompressed AV signals of regional TV programs are entering AV encoders (1L11 to 1Lmv). Regional TV programs per region are part of second statistical multiplex.

All AV encoder 1 outputs, are in form of IP packets transmitted via local area network, most often via Ethernet, to the all IP encapsulators 8. This guarantees that all repeated transport stream I. 2 packets of global TV programs in different transport streams II. 9 are identical.

IP encapsulators 8 receive selected TV programs, transport streams I. 2 for given region. Via IP multicast. Output of IP encapsulator 8 is transport stream II. 9 in MPEG-2 TS format. In case of SFN networks, output of IP encapsulator 8 is further SFN adapter by MIP inserter. Multiplexer 14 thus receives either transport streams II. 9 from IP encapsulators 8 (in case it is not SFN network), or SFN adapted ones from MIP inserters 12.

Important function of multiplexer 14 is reconstruction of transport stream I. 2 packets from transport streams II. 9 their comparison and replacement of repeated packets by reference ones. Reference packets 2R, 9R can be broadcast for example in form of e.g. Private Data.

In a multiplexer 14 identical (conflicting) PIDs, in different transport streams II. 9 are temporarily changed to different values, which are not present, neither in other transport streams II. 9 nor were used as temporary values. Multiplexer 14 inserts into multiplexed output transport stream III. 16 additional control information about transport stream II. 9 structure, association between temporary and original PID values.

To IP encapsulators 8 are also routed IP packets 2 from ESG servers (electronic service guide) as well as IP packets 2 from SPP subsystem (service purchase and protection) (CAS conditional access system, DRM digital rights management) in form of KMM, KSM messages. Conflict IP addresses (e.g. ESG bootstrap) can be remapped to other IP addresses at the source, it means ESG server 1 and returned back by IP encapsulator 8, or there can be ESG server per given region connected via isolated Ethernet network to corresponding IP encapsulator 8.

Output of multiplexer 14 is multiplexed transport stream III. 16 created by multiplexing regionalized transport streams II. 9 with remapped PIDs, and significantly reduced reference packets in size of global programs with added control signals.

Schematic structure of multiplexed transport stream III. is at FIG. 6) Schematic description of processed transport stream II. with global TV programs reference packets at the output of multiplexer. and FIG. 7) Schematic description of multiplexed transport stream III.

Multiplexed transport stream III. 16 is transmitted via satellite distribution network 17 transmitted to the satellite receivers, where from it enters to adapters 18. Inside adapters 18 demultiplexing of selected transport stream II. 9 takes place, temporary PID values are returned to original ones, and reference packets 2R, 9R are replaced with original packets, based on additional control packets, in such a way that adapter 18 outputs transport stream II. 9 bitwise identical with the transport stream II. 9 at the multiplexer 14 input for given region.

Solution is described at FIG. 1) Diagram of transport streams satellite transmission.

Example 3

Is analogical to example 1, with such a difference, that multiplexer 14 reconstructs content packets at lowest layer, encapsulated within transport stream I. 2, and repeated content packets, replaces by reference packets of content packets. Advantage of such solution is bandwidth savings (e.g. video), even when same content is formatted to different formats of transport stream I. packets, e.g. RTP in case of DVB-H and MPEG-2 for DVB-T.

Example 4

Is analogical to example 1, where transport stream generators I. 1 are not only video encoders, but also streaming server, PSI/SI tables generator, ESG server (for DVB-H), EPG (for DVB-T), teletext server (for DVB-T), MHP server (for DVB-T) or CAS server, file multicast server, FLUTE server (for DVB-H), or CAS server etc.

Example 5

Is analogical to example 1, with such a difference, it is applied to DVB-T networks with satellite distribution. All AV encoders outputs 1 are transmitted in a form of MPEG-2 PES packets to MPEG-2 multiplexers 8. MPEG-2 multiplexers 8 have connected only TV programs for given region. Outputs of MPEG-2 multiplexers 8 are transport streams II. 9 in a form of MPEG-2 TS packets. In case of SFN networks, SFN adapters (MIP inserters) 12 are connected behind MPEG-2 multiplexers.

Important function of multiplexer 14 is reconstruction of transport stream I. 2 packets, in case of DVB-T PES packets, their comparison and replacements of repeated PES packets by reference packets 2R. Reference packets can be transmitted as private data.

In a multiplexer 14 identical (conflicting) PIDs, in different transport streams II. 9 are temporarily changed to different values, which are not present, neither in other transport streams II. 9 nor were used as temporary values. Multiplexer 14 inserts into multiplexed output transport stream III. 16 additional control information about transport stream II. 9 structure, association between temporary and original PID values.

Multiplexed transport stream III. 16 is transmitted via satellite distribution network 17 transmitted to the satellite receivers, where from it enters to adapters 18. Inside adapters 18 demultiplexing of selected transport stream II. 9 takes place, temporary PID values are returned to original ones, and reference packets 2R, 9R are replaced with original packets, based on additional control packets, in such a way that adapter 18 outputs transport stream II. 9 bitwise identical with the transport stream II. 9 at the multiplexer 14 input for given region.

Solution is described at FIG. 1) Diagram of transport streams satellite transmission.

Example 6

Is analogical to example 1, with such a difference that output bitrates of transport stream I. 2 generators 1 are constant (CBR)

Example 7

Is analogical to example 1, while sum of global programs transport streams I. 2 bitrates is constant (CBR) as well as sum of all regional program (e.g. 2L1 to 2Lm) transport streams I. 2 bitrates is constant (CBR) and the same per each region, while global program's control unit 3G controls variable (VBR) bitrate of individual global transport stream I. 2 within global programs (1G1 to 1Gn), and regional program's control units (3L1 to 3Lm) control transport streams I. 2 variable (VBR) bitrates within regional programs (e.g. 3L1 to 3Lm).

Solution is described at FIG. 4) Diagram of 1-level bitrates control of transport stream I. generators

Example 8

Is analogical to example 1, while sum of global program's transport streams I. 2 bitrates is also variable (VBR), as well as sum of regional programs transport streams I. 2 bitrates is variable (VBR), while constant (CBR) is only the sum of all global and regional transport streams I. 2 bitrates per region, and the same per each region, while main control unit 4 controls global program control unit 3G as well as regional program control unit 3L, while global program control unit 3G controls variable (VBR) bitrates of global programs (1G1 to 1Gn) transport streams I. 2 and regional programs control units (e.g. 3L1 to 3Lm) controls variable (VBR) bitrates of regional programs' (e.g. 2L1 to 2Lm) transport streams I. 2.

Solution is described at FIG. 3) Diagram of 3-level bitrates control of transport streams I. generators.

Example 9

Is similar to example 2, with such a difference that FEC data, are deleted from MPE-FEC sections, either in IP encapsulator 8 or in multiplexer 14, it means before distribution via distribution network 17. FEC data are calculated in adapter 18 and are inserted in MPE-FEC sections. This approach in case of DVB-H, saves a significant part of a distribution network 17 bandwidth.

Example 10

Is similar to example 2, with such a difference that FEC data are kept within transport stream II. 9 and are used for fixing of potential packet looses or corruptions during transmission.

Example 11

Is similar to example 3, with such a difference that instead of DVB-T networks this solution is deployed in ATSC or ISDB networks. Replacement of repeated packets is done at PES level 2 it means at transport stream I. 2 level.

Example 12

Is similar to example 1, 2 and 3 while multiplexer 14 replaces also "null packets" according to MPEG-2 TS standards, by reference packets 9R or erases them. Reference packets 9R are replaced by same null packets in all adapters 18 in the same network.

Example 13

Is similar to example 3, with such a difference, that is on top supports "seamless handover", In this case there are 4 transport streams II. 9 generated per each region, with time shifted IP packets within DVB-H bursts for different SFN cells, transmitted at different frequencies.

Solution is described at FIG. 2) Diagram of the satellite distribution of DVB-H transport streams II. with "seamless handover" support

Example 14

Presents combinations of solutions described in examples 2 and 3, while DVB-H and DVB-T transport streams I. 2 are generated by the same AV encoders 1 deploying scalable coding. Multiplexer reconstructs these streams down at the content packets layer, reconstructing from transport stream I. 2 packets e.g. I, B, P frames, which are in case of repeated appearance replaced by reference packets by multiplexer 14 before distribution network. Adapters 18 are replacing reference packets by original content packets.

Example 15

Is similar to example 2, with such a difference, that transport stream I. 2 generator 1 is located remotely from a broadcast center. In case of deploying control units 3 and 4 networks with shortest response time (RTT) have to be used to enable interactive communication of remote transport stream I. 2 generators 1. Because of most of IP networks have disabled IP multicast support, packets to multiple transport stream II. 9 generators 8, is transmitted via "unicast" to the single gateway 22, which changes IP unicast to IP multicast, what enables parallel transmission of transport stream I. 2 packets from remote transport stream I. 2 generator 1 to multiple transport stream II. 9 generators 8.

Solution is described at FIG. 9) Connection of remote AV encoder via unicast IP network.

Example 16

Is analogical to example 1, where transport stream III. 16 is transmitted via radio and cable telecommunication networks or via terrestrial radio networks such as WIMAX, WIFI, 3G, 4G or via multicast IP networks.

Example 17

Is analogical to example 1, while transport streams II. 9 are generated according to the DVB, ATSC, ISDB, IP, DAB, DVB-H, DAB, DAB-IP, DMB, CMMB, MediaFlo, BCAST, DVB-SH standards.

Example 18

Is analogical to example 1, while control units 3 for controlling transport stream I. 2 generators 1 deploy mechanism of statistical multiplexing, e.g. changing AV compression parameters like quantization, synchronization of I-frames generation within AV encoders 1, mechanism of opportunistic data insertion, or allocation fixed bandwidth according to the prior set rules for individual transport stream I. 2 generators 1.

Example 19

Is analogical to example 1, while coordination between individual transport stream I. 2 generators 1 is controlled by generators 1 control unit 10.

Example 20

Contribution regional transport streams I. 2.1. are transmitted via satellite to the generator 8.1. of transport streams II. 9.1. and from here, a single remote common source, regional contribution transport streams II. 9.1. are transmitted in parallel to transport stream II. 9 generator at broadcast center, with a transport stream II. 9 remultiplexing capability, as well to the adapters 18. Multiplexer 14 replaces original contribution regional transport streams I. 2.1., reconstructed from transport streams II. 9, with reference packets 2.1.R., serving for unique identification of original contribution regional transport streams I. 2.1. packets, and for specification of positions of transport stream I. 2.1. packets, or packet segments, within the transport stream II. 9 packets. Adapter 18 replaces reference packets 2.1. with original contribution regional transport stream I. 2.1. packets, it received in parallel or in slightly in advance, from a parallel transmission within a contribution regional transport stream II. 9.1. from a contribution regional transport streams II. 9.1. generator 8.1., and a reconstruction of contribution regional transport stream I. 2.1. packets, and places these packets, or their segments, into original positions inside transport stream II. 9 packets, transmitted via TV or radio transmitters within SFN or MFN networks.

Solution is described at FIG. 10) Diagram of satellite transmission of remote regional contribution transport streams II.

Example 21

Contribution regional transport streams I. 2.1. among transport streams I. 2, are transmitted via satellite in parallel to the transport stream II. 9 generators 8 at the broadcast center, as well as to the adapters 18, from a single remote common source a generator 1.1. of contribution regional transport streams I. 2.1. Multiplexer 14 replaces original contribution regional transport streams I. 2.1. packets with reference packets 2.1.R., serving for unique identification of original contribution regional transport stream I. 2.1. packets, and for specification of positions of contribution regional transport stream I. 2.1. packets, or packet segments, within the transport stream II. 9 packets. Adapter 18 replaces reference packets 2.1. with original contribution regional transport stream I. 2.1. packets, it received, in parallel or slightly in advance, from a parallel transmission of contribution regional transport stream I. 2.1. from contribution regional transport streams I. 2.1. generator 1.1., and places original contribution regional transport stream I. 2.1. packets, or their segments, into original positions inside transport stream II. 9 packets.

Solution is described at FIG. 11) Diagram of satellite transmission of remote regional contribution transport streams I.

Example 22

Transport stream I. 2 packets containing recorded content, multiplexer 14 replaces with transport stream I. 2 reference packets 2R, serving for unique identification of original transport stream I. 2 packets and for specification of positions of transport stream I. 2 packets, or packet segments, within transport stream II. 9 packets, while original transport stream packets I. 2 are transmitted to adapters 18 in advance. Adapter 18 replaces transport stream I. 2 reference packets 2R with original transport stream I. 2 packets, available in adapter 18 memory from advanced transmission of recorded content, and places these original packets, or their segments, to their original positions within transport stream II. 9 packets.

Transport streams I. 2 packets with recorded content, can be transmitted to adapters 18 for example via transport stream III. 16 or via other distribution channels, like IP networks, or even via different memory storage media, e.g USB keys.

Multiplexer 14 has to know, which transport stream I. 2 packets are to be replaced by reference ones 2R, despite of the fact they appear within all transport streams II. 9 only once, so in normal case those transport stream I. 2 packets would be transmitted untouched and would not replaced them by reference packets 2R. This can be achieved for example by storing such in advance transmitter transport stream I. 2 packets, into multiplexer 14 memory, and involving this packet into comparative algorithm of transport stream I. 2 packets.

Example of distribution of global TV channels with embedded regional advertisement, is described at FIG. 12) Diagram of satellite distribution of global TV programs with embedded regional advertisement.

Example 23

Is analogical to the example 22 with a feature, that transport stream I. 2 packets with recorded non live content, which are transmitted via transport stream III. 16 are transmitted with forward error correction code, which enables calculating of dropped packets or fix of corrupted packets.

Example 24

Is analogical to the example 23, with such a difference, that transport stream I. 2 packets with recorded non live content, which are transmitted via transport stream III. 16 are transmitted in the unused bandwidth, by replacing null packets of transport streams III. 16 or transport streams II. 9.

Example 25

Is analogical to the example 23, with such a difference, that adapters 18 sends from time to time information about unsuccessfully transmitted transport stream I. 2 packets with recorded content to the broadcast center. Based on these information multiplexer 14 retransmits missing packets, or additional forward error correction code enabling adding given range of missing packets to adapters 18.

Example 26

DVB-S2 satellite receivers 42 or adapters 18 via a return channel 41, like for example DVB-RCS, SCPC or via terrestrial links, send information in real-time about satellite distribution link 17 quality to the control unit 45. Control unit 45, based on this information periodically calculates such parameters of satellite modulation and coding per each region and for global coverage, by which it achieves lowest satellite DVB-S2 distribution link 17 bandwidth, means highest bit/Hz ratio. For calculation of optimal transmission parameters of packets transmitting regional content per each region, control unit 45 takes into consideration all information gathered from all satellite receivers 42 or adapters 18 in given region, and sets parameters, which guarantee defined quality of transmission e.g. BER in time T, or PER in time T, for satellite receivers 42 with worst satellite reception conditions within given region.

Such calculated parameters of satellite transmission for different regions and global coverage, control unit 45 periodically transmits to DVB-S2 modulator 40 which based on those information sets modulation and coding parameters individually for individual transport stream III. 16 packets. This method is known in DVB-S2 field as ACM—adaptive coding and modulation.

Example of deploying ACM in DVB-S2 satellite distribution is described at FIG. 13) ACM utilization diagram in DVB-S2 satellite transmission.

Example 27

Is similar to example 2, with such a difference, that also transport stream I. 2 Audio Video IP packets from transport stream I. 2 generators 1 of Audio Video packets are transmitted via IP network, e.g. via Ethernet network are entering multiplexer 14.

In parallel MPEG-2 DVB-H transport stream II. 9 from transport stream II. 9 DVB-H generators 8 are transmitted for example via DVB-ASI link, which may be optionally SFN adapted by MIP inserters 12 (also called SFN adapters).

Multiplexer 14 multiplexes IP packets from IP Ethernet input of Audio Video transport streams I. 2, entering multiplexor 14 advance in time, comparing to the MPEG-2 DVB-H transport stream II. 9 packets, in such way into single distribution transport stream III. 16, that audio video transport streams I. 2 IP packets appearing in given time frame more than once, replaces with transport stream I. 2 reference packets 2R, serving for unique identification of original transport stream I. 2 packets, and for the specification of positions of transport stream I. 2 packets, or packet segments, within the transport stream II. 9 packets.

Meanwhile multiplexer 14 stores one copy of audio video transport stream I. 2 IP packet into multiplexer 14 memory of compression dictionary.

With certain time delay, caused by DVB-H transport streams II. 9 generators 8 performing time slicing, consequently audio video transport stream I. 2 IP packets are reconstructed, and replaced by transport stream I. 2 reference packets 2R in case given audio video transport stream I. 2 IP packet is already present in multiplexer's 14 memory of compression dictionary.

Reference packets 2R are before entrance to the distribution networks 17 multiplexed with other audio video transport stream I. 2 packets, and are consequently encapsulated into single distribution transport stream III. 16.

Adapter 18, demultiplexes selected transport stream(s) II. 9 from transport stream III. 17, and replaces transport stream I. 2 reference packets 2R with original transport stream I. 2 packets, and places these packets, or their segments, to their original positions within transport stream II. 9 packets, and/or replaces reference packets 9R with original packets, or part of transport stream packets II. 9, in such a way, that adapter 18 outputs transport stream II. 9 bitwise identical with the transport stream II. 9 at the multiplexer 14 input for given region.

After termination of distribution network 17 adapters 18 replaces transport stream I. 2 reference packets 2R with original audio video transport stream I. 2 IP packets and demultiplexes selected MPEG-2 DVB-H transport stream II. 9 from a distribution transport stream III. 16.

Demultiplexed reconstructed MPEG-2 DVB-H transport stream II. 9 is at the same time SFN adapted, organized in megaframes containing time marks for synchronization of multiple transmitters, and ready for broadcasting in SFN cell.

Solution is described at FIG. 14) Diagram of parallel connection of DVB-ASI and IP inputs to Multiplexer.

Example 28

Is analogical to example 1, with such a difference, that multiplexer 14 knows which of the transport streams I. 2 is part of multiple transport streams II. 9, it means which of transport streams I. 2 are global, and which are part only of one regionalized transport stream II. 9. This information improves processing efficiency and decreases volume of additional information, in the same time reducing time of transport stream II. 9 processing in the multiplexer 14, thanks to the elimination of reference packets 2R generation for regional transport streams I. 2.

Example 29

Is analogical to example 28, with such a difference, that multiplexer 14 has its own mechanism able to identify, which of the transport streams I. 2 is global and which one is regional. This mechanism is based on watching multiple appearance of transport stream I. 2 packets in multiple transport streams II. 9. This mechanism periodically updates categorization of transport streams I. 2.

INDUSTRIAL USABILITY OF INVENTION

Typical example of invention deployment is DVB-H network, containing regional TV and radio channels in particular regions (typically SFN cells), while global TV and radio channels are identical in majority or in all of transport streams. In case there is for example 9 regions, where 10 of TV channels is the same (global content), and other 2 are regional specific (regional content), 9 complete DVB-H MPEG-2 transport streams is generated in broadcast center. These 9 transport streams are before their distribution compressed and decompressed at transmitters, in a way, that transport streams maintain all necessary parameters for broadcasting within SFN network.

Given invention is possible to deploy not only in mobile TV networks based at DVB-H standards, but also in mobile TV networks based on different standards such as DAB, DMB, CMMB, MediaFlo, WIMAX, respectively BCAST in 3G networks.

Given method if transport streams distribution is possible deploy for satellite signal distribution for ordinary (non mobile) terrestrial digital TV networks e.g. for DVB-T, ISDB, ATSC networks.

Given method of transport stream distribution is possible to deploy not only for satellite distribution, but in all other kinds of broadcast networks.

Given method of transport stream distribution is possible to deploy also in IP multicast distribution networks.

Given method of transport stream distribution is possible to deploy in distribution-contribution digital TV and radio networks with parallel satellite transmission from regional studio to the broadcast center as well to adapters. Satellite bandwidth in this case is reduced roughly by one half.

Given method of transport stream distribution is possible to deploy in digital TV networks requiring embedding regional advertisement into global TV programs, so during this time single global channel transforms to multiple regional ones. Condition to deploy this method that advertisement is prerecorder.

Given method of transport stream distribution is possible to deploy in DVB-S2 satellite distribution networks where there is return channel from transmitters to the broadcast center.

Given method of transport stream distribution is possible to deploy in digital TV and radio distribution networks for distribution of multiple regionalized DVB-H streams directly to TV transmitters.

The invention claimed is:

1. A method of bandwidth efficient distribution of multiple transport streams with partially the same content comprising the steps of:

transmitting multiple first layer transport streams from first layer transport stream generators in parallel to multiple second layer transport stream generators, where partially same second layer transport streams are generated, transmitting said partially same second layer transport streams to a multiplexer, where packets of said first layer transport streams are reconstructed from said second layer transport streams, or transmitting multiple first layer transport streams to the multiplexer in parallel with said second layer transport streams in order to eliminate time delay brought-in by said second layer transport stream generators, in both cases, transmitting via a third layer transport stream at least one of a packet of said first layer transport stream, and a packet, or only a part of the packet, of said second layer transport stream which appears in a given time period more than once, it is transmitted only once in its original form, replacing by said multiplexer repeatedly appearing first layer transport stream packets with first layer transport stream reference packets, serving for unique identification of original first layer transport packets, and for specification of positions of first layer transport stream packets, or packet segments, within second layer transport stream packets;

replacing by said multiplexer repeatedly appearing packets, or parts of packets, of the second layer transport stream with second layer transport stream reference packets, serving for unique identification of packets, or parts of said second layer transport stream packets;

inserting, by said multiplexer, first layer transport stream reference packets, second layer transport stream reference packets, or reference packets of parts of second layer transport stream packets, and at least one of additional control information, and additional identification information beside the at least one of the original first layer transport stream packets and second layer transport stream packets, or parts of second layer transport stream packets;

providing an adapter;

demultiplexing, by said adapter, selected second layer transport stream(s) from the third layer transport stream;

replacing first layer transport stream reference packets with original first layer transport stream packets from said third layer transport stream and performing at least one of the two following steps:

(1) placing said original first layer transport stream packets, or their segments, in their original positions within second layer transport stream packets; and (2) replacing said second layer transport stream reference packets with original said second layer transport stream packets, or part of said second layer transport stream packets in such a way that the adapter outputs said second layer transport stream bitwise identical with the second layer transport stream at a multiplexer input for a given region.

2. A method of bandwidth efficient distribution of multiple transport streams with partially the same content according to the claim 1, including transmitting first contribution regional first layer transport streams among the first layer transport streams in parallel to the second layer transport stream generators at a broadcast center, as well as to the adapters, from a single remote common source generator of the contribution regional first layer transport streams, and wherein the multiplexer replaces original contribution regional first layer transport stream packets with the first layer transport stream reference packets, serving for unique identification of original contribution regional first layer transport stream packets, and for specification of positions of contribution regional first layer transport stream packets, or packet segments, within the second layer transport stream packets, and wherein the adapter replaces the first layer transport stream reference packets with the original contribution regional first layer transport stream packets received by the adapter, in parallel or slightly in advance, from a parallel transmission of the contribution regional first layer transport stream from the contribution regional first layer transport streams generator, and wherein the adapter places the original contribution regional first layer transport stream packets, or their segments, into original positions inside the second layer transport stream packets; or wherein said contribution regional first layer transport streams are transmitted to the generator of said second layer transport streams and from here, a single remote common source, regional contribution second layer transport streams are transmitted in parallel to a second layer transport stream generator at said broadcast center, with a second layer transport stream remultiplexing capability, as well to the adapters, and wherein said multiplexer replaces original contribution regional first layer transport streams, reconstructed from said second layer transport streams, with the first layer transport stream reference packets, serving for unique identification of the original contribution regional first layer transport stream packets, and for specification of positions of the first layer transport stream packets, or packet segments, within the second layer transport stream packets, and wherein the adapter replaces the first layer transport stream reference packets with the original contribution regional first layer transport stream packets which the adapter received in parallel or in slightly in advance, from a parallel transmission within a contribution regional second layer transport stream from said contribution regional second transport streams generator and a reconstruction of said contribution regional first layer transport stream packets, and wherein the adapter places these contribution regional first layer transport stream packets, or their segments, into original positions inside said second layer transport stream packets.

3. A method of bandwidth efficient distribution of multiple transport streams with partially the same content according to claim 2, wherein the multiplexer replaces the first layer transport stream packets containing recorded content with first layer transport stream reference packets, serving for unique identification of original first layer transport stream packets and for specification of positions of the first layer transport stream packets, or packet segments, within the second layer transport stream packets, while the original first layer transport stream packets are transmitted to the adapters in advance, and wherein the adapter replaces the first layer transport stream reference packets with the original first layer transport stream packets, which are available in an adapter memory from advanced transmission of recorded content, and wherein the adapter places these original first layer transport stream packets, or their segments, to their original positions within the second layer transport stream packets.

4. A method of bandwidth efficient distribution of multiple transport streams with partially the same content according to claim 3, including sending information from DVB-S2 satellite receivers or adapters via a return channel in real-time about satellite distribution link quality, and wherein a first control unit, based on the information, periodically calculates parameters of satellite DVB-S2 transmission, resulting in a reduced satellite distribution network bandwidth requirement, and wherein the first control unit periodically sends information about calculated DVB-S2 satellite transmission parameters settings for a given third transport stream packet individually per particular region and for global content, to a DVB-S2 modulator, which modulator adaptively sets optimal parameters settings, selected from the group consisting of coding and modulation for each particular third transport stream packet.

5. A method of bandwidth efficient distribution of multiple transport streams with partially the same content according to claim 4, wherein the multiplexer reconstructs lower layer content packets, which are encapsulated within the first layer transport stream packets, and, in the event that content packet appears in said first layer transport streams more than a once, the multiplexer transmits such a content packet in original form only once via said third layer transport stream and wherein the multiplexer handling said content packets appearing in said first layer transport streams more than once replaces repeated content packets by reference content packets, serving for unique identification of original content packets, and for specification of content packets, or its segment, within the first layer transport stream packets and wherein the adapter replaces reference content packets by original content packets and places the original content packets, or original content packet segments, into original positions within the first layer transport stream packets.

6. A method of bandwidth efficient distribution of multiple transport streams with partially the same content according claim 5, wherein the multiplexer changes same PIDs in said second layer transport streams to different temporary values, which are neither present in any other transport streams nor are used as temporary values, while the multiplexer inserts, into the third layer transport stream additional control information about structures of said second layer transport streams, associations between temporary and original PID values, and wherein the adapter reconstructs original selected second layer transport stream based on additional control information, and wherein the adaptor returns temporary PID values to original PID values.

7. A method of bandwidth efficient distribution of multiple transport streams with partially the same content according to claim 6, wherein a Single Frequency Network adapter is placed in between the second layer transport stream generator and the multiplexer.

8. A method of bandwidth efficient distribution of multiple transport streams with partially the same content according to claim 7, wherein bitrates of all first layer transport streams are constant; or wherein a sum of bitrates of a global program's first layer transport streams is constant as well as a sum of bitrates of all regional program first layer transport streams is constant and the same per each region, and wherein a global program's control unit controls variable bitrate of individual global first layer transport stream within global programs, and wherein a regional program's control units control first layer transport streams variable bitrates within regional programs; or wherein a sum of bitrates of a global program's first layer transport streams is also variable, as well as a sum of bitrates of a regional programs first layer transport streams is variable, while a sum of bitrates of all global and regional first layer transport streams is constant per region, and the same per each region, while a main control unit controls a global program control unit as well as a regional program control unit, while a global program control unit controls variable bitrates of global programs' first layer transport streams and regional programs' control units controls variable bitrates of regional programs' first layer transport streams.

9. A method of bandwidth efficient distribution of multiple transport streams with partially the same content according claim 8, wherein the multiplexer erases FEC data from MPE-FEC sections of said second layer transport streams in DVB-H networks before distribution via a distribution network, and wherein the adapters calculate FEC data locally and inserts the data into respective MPE-FEC sections of said second layer transport streams, or wherein the multiplexer leaves FEC data in MPE-FEC sections of said second layer transport streams and in the event of packet losses occur in the distribution network, missing or corrupted packets are fulfilled or fixed using MPE-FEC packets.

10. A method of bandwidth efficient distribution of multiple transport streams with partially the same content according claim 9, wherein the multiplexer replaces null packets of said second layer transport streams before a transmission inside said third layer transport stream via the distribution network, and including the steps of specifying null packet position within original said second layer transport stream with reference packets, and optionally also specifying a continuity counter, or also selected parts of a packet header, or eventually entire null packet headers, and after transmission via the distribution network, replacing reference packets by all of the adapters with same null packets and placing said null packets into original positions within said second layer transport stream based on control information in said third layer transport stream.

11. A method of bandwidth efficient distribution of multiple transport streams with partially the same content according to claim 10, wherein said second layer transport stream generators generate multiple second layer transport streams with time shifted IP packets within individual bursts for neighboring network cells in DVB-H networks with substantially seamless handover.

12. A method of bandwidth efficient distribution of multiple transport streams with partially the same content according to claim 11, wherein said first layer transport stream generators are selected from the group consisting of AV encoder, streaming server, file multicast server, FLUTE server, ESG server, EPG server, MHP server, CAS server, Teletext server, and PSI/SI tables generator and combinations thereof.

13. A method of bandwidth efficient distribution of multiple transport streams with partially the same content according to claim 11, wherein said second layer transport stream are transmitted in formats selected from the group consisting of DVB, ATSC, ISDB, IP, DAB, DVB-H, DAB, DAB-IP, DMB, CMMB, MediaFlo, BCAST, and DVB-SH.

14. A method of bandwidth efficient distribution of multiple transport streams with partially the same content according to claim 13, wherein said multiplexed third layer transport stream is distributed via the group consisting of radio links, cable telecommunication networks, telecommunication satellites, terrestrial wireless networks, IP multicast networks, terrestrial cable networks and telecommunication airships.

15. A method of bandwidth efficient distribution of multiple transport streams with partially the same content according claim 11, wherein said first layer transport streams are transmitted from said first layer transport stream generators to said second layer transport stream generators via local area networks, GbE or DVB-ASI interface.

16. A method of bandwidth efficient distribution of multiple transport streams with partially the same content according to claim 11, including the step of providing control units and controlling said first layer transport streams generators deploy rate control between said first layer transport stream generators and said second layer transport stream generators, said controlling step including control functions selected from the group consisting of statistical multiplexing, rate control using AV compression parameters adaptation including quantization or synchronization of I-frames insertion between AV Encoder and IPE, opportunistic data bandwidth allocation according to fixed rules, and bandwidth allocation according to dynamic bandwidth allocation based on priorities based on said first transport streams generators requirements, or combinations thereof.

17. A method of bandwidth efficient distribution of multiple transport streams with partially the same content according to claim 11, wherein interoperation between said second layer transport streams generators is controlled by a second control unit.

18. A method of bandwidth efficient distribution of multiple transport streams with partially the same content according to claim 11, wherein when said first layer transport stream generator is located remotely from a broadcast center, which broadcast center is connected via a network non supporting parallel transmission of said first layer transport stream packets to multiple said second layer transport stream generators, said first transport stream is transmitted via "unicast" to a single gateway, which gateway changes IP unicast to IP multicast and enables parallel transmission of said first transport stream packets from the remote first layer transport stream generator to said multiple second layer transport stream generators.

* * * * *